(12) United States Patent
Vasel et al.

(10) Patent No.: US 6,393,992 B1
(45) Date of Patent: *May 28, 2002

(54) NON-LETHAL PROJECTILE FOR DELIVERING AN INHIBITING SUBSTANCE TO A LIVING TARGET

(75) Inventors: Edward J. Vasel; Scott C. Nunan; Gregory A. Niederhaus, all of San Diego; Peter G. Coakley, Cardiff, all of CA (US)

(73) Assignee: Jaycor Tactical Systems, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/289,258

(22) Filed: Apr. 9, 1999

Related U.S. Application Data

(63) Continuation-in-part of application No. 08/751,709, filed on Nov. 18, 1996, now Pat. No. 5,965,839.
(51) Int. Cl.$^7$ ................................................ F42B 12/46
(52) U.S. Cl. ...................... 102/502; 102/367; 102/370; 102/444; 102/517; 102/529; 473/577
(58) Field of Search ................................. 102/367, 370, 102/395, 444, 498, 502, 513, 529, 501, 517; 42/1.08; 473/577; 86/20.14

(56) References Cited

U.S. PATENT DOCUMENTS

| | | | |
|---|---|---|---|
| 1,517,554 A | 12/1924 | Fulcher | 102/370 |
| 3,419,274 A | 12/1968 | Tabor | 102/517 |

(List continued on next page.)

FOREIGN PATENT DOCUMENTS

| | | | |
|---|---|---|---|
| DE | 4321041 | 1/1995 | 102/502 |
| WO | 9428371 | 12/1994 | 102/502 |

*Primary Examiner*—Harold J. Tudor
(74) *Attorney, Agent, or Firm*—Fitch, Even, Tabin & Flannery

(57) ABSTRACT

Projectile systems are provided herein employing an inhibiting and/or marking substance for impairing/marking a living target, such as a human or animal target, which projectile systems are optimized to provide maximum effectiveness by impacting the target with sufficient force to cause the target to move into a simultaneously radially dispersing inhibiting/marking substance contained within a capsule of the projectile system. In preferred embodiments, the projectile system includes a generally spherical capsule that is optimally filled to greater than about 50%, more preferably about 75% to 99% of its total volume, most preferably to about 90% of capacity, with the substance to be delivered to the target. The capsule is preferably formed as two about equal halves. Each half is then filled to about 90% of its capacity with the substance, which is compressed mechanically or a thin membrane, preferably a paper foil, is placed over the substance or the substance is mechanically compressed within each half to retain the same within the half capsule. The two half capsules are then brought together, for example, by snapping them together, and are then sealed to one another. In an alternative embodiment, the sealed capsule employs a plurality of dimples or a matrix of global scoring in an exterior or interior surface of the capsule of the projectile system to facilitate rupture of the capsule upon impact with a living target. The projectile systems described herein are easily and inexpensively manufactured; are readily incorporated into existing armed officer training programs; and are extremely effective at stopping, slowing and/or marking a living target.

17 Claims, 13 Drawing Sheets

U.S. PATENT DOCUMENTS

| | | | |
|---|---|---|---|
| 3,528,662 A | 9/1970 | Merchant et al. ........ 273/106.5 |
| 3,650,213 A | 3/1972 | Abbott et al. ............... 102/444 |
| 3,707,793 A | 1/1973 | Holton, II .................. 42/1 G |
| 3,765,116 A | 10/1973 | Zaid .............................. 42/89 |
| 3,791,303 A | 2/1974 | Sweeney et al. ............ 102/502 |
| 3,865,038 A | 2/1975 | Barr ........................... 102/502 |
| 3,921,614 A | 11/1975 | Fogelgren ................. 124/30 R |
| 4,153,927 A | 5/1979 | Owens ......................... 362/99 |
| 4,352,316 A | 10/1982 | Medlin ....................... 89/36 A |
| 4,449,474 A | 5/1984 | Mariol ........................... 116/2 |
| 4,560,168 A | 12/1985 | Aoyama ..................... 273/232 |
| 4,686,905 A | 8/1987 | Szabo ......................... 102/444 |
| 4,856,218 A * | 8/1989 | Reynolds, Jr. ................ 42/103 |
| 4,899,660 A | 2/1990 | Brighton ..................... 102/447 |
| 4,979,747 A | 12/1990 | Jonkouski ................... 273/232 |
| 5,001,880 A | 3/1991 | Smith ........................... 53/453 |
| 5,018,450 A | 5/1991 | Smith ......................... 102/513 |
| 5,035,183 A | 7/1991 | Luxton ....................... 102/502 |
| 5,078,117 A | 1/1992 | Cover ......................... 124/71 |
| 5,217,708 A | 6/1993 | Pinkney ........................ 424/45 |
| 5,254,379 A | 10/1993 | Kotsiopoulos et al. ..... 428/35.7 |
| 5,353,712 A | 10/1994 | Olson ......................... 102/502 |
| 5,361,700 A | 11/1994 | Carbone ..................... 102/439 |
| 5,402,729 A | 4/1995 | Richert ....................... 102/502 |
| 5,450,795 A * | 9/1995 | Adelman .................... 102/502 |
| 5,529,215 A | 6/1996 | Banks et al. ................ 222/113 |
| 5,565,649 A | 10/1996 | Tougeron et al. ........... 102/502 |
| 5,620,704 A | 4/1997 | Cade et al. .................. 424/456 |
| 5,639,526 A | 6/1997 | Kotsiopoulos et al. ...... 102/502 |
| 5,640,945 A | 6/1997 | Slonaker et al. .............. 124/56 |
| 5,671,559 A | 9/1997 | Ludaesher et al. ........... 42/1.08 |
| 5,750,918 A * | 5/1998 | Mangolds et al. .......... 102/502 |
| 5,791,327 A * | 8/1998 | Riggs et al. .................. 124/71 |
| 5,965,839 A * | 10/1999 | Vasel et al. ................. 102/502 |
| 6,145,441 A * | 11/2000 | Woodall et al. ............. 102/502 |
| 6,223,658 B1 * | 5/2001 | Rosa et al. .................. 102/501 |
| 6,230,630 B1 * | 5/2001 | Gibson et al. ............... 102/502 |
| 6,302,028 B1 * | 10/2001 | Guillot-Ulmann et al. .. 102/502 |

\* cited by examiner

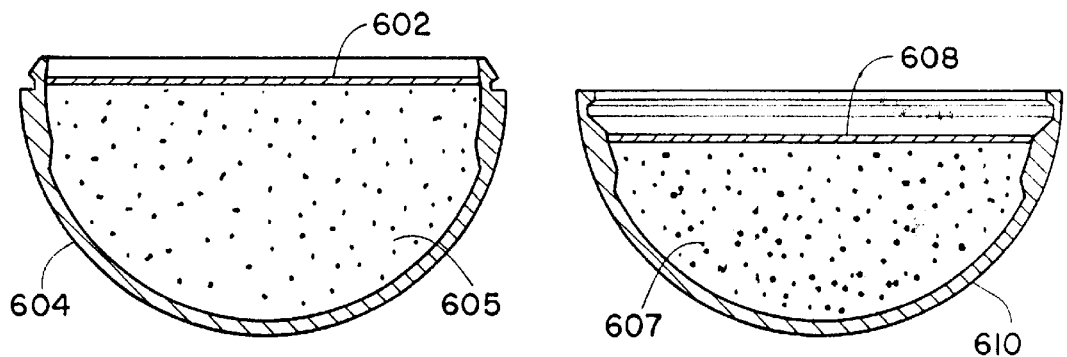
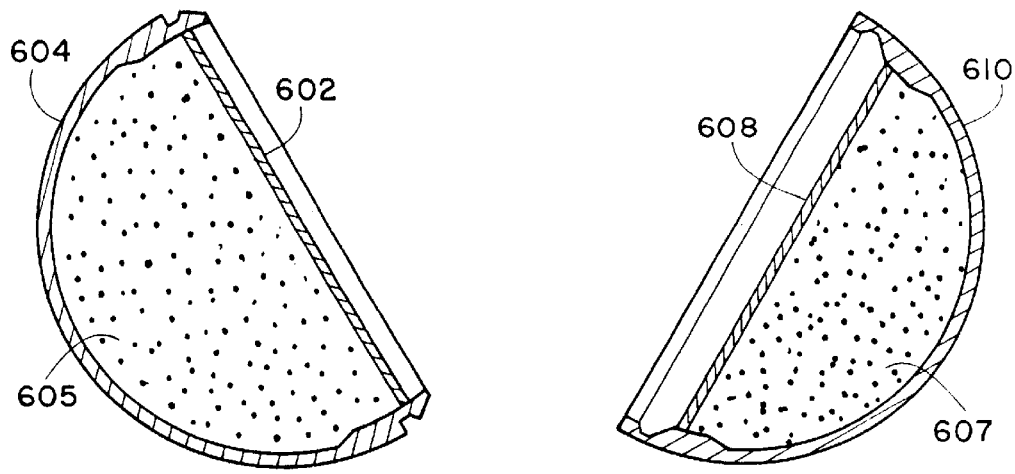
FIG. 2
FIG. 3
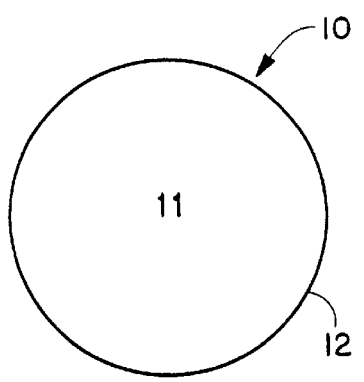
FIG. 1
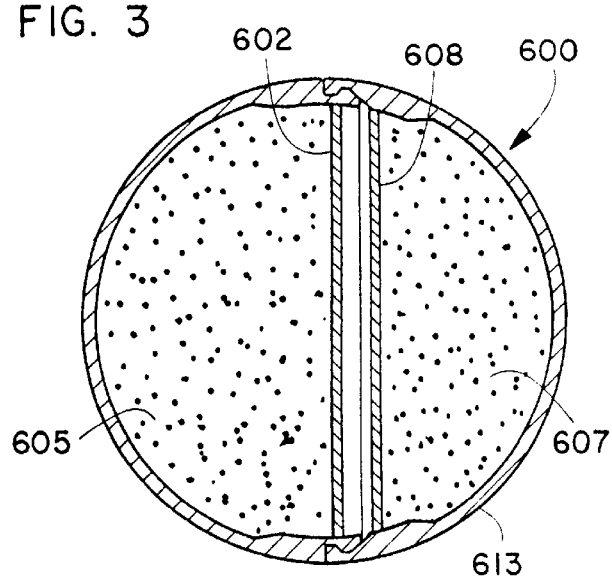
FIG. 4

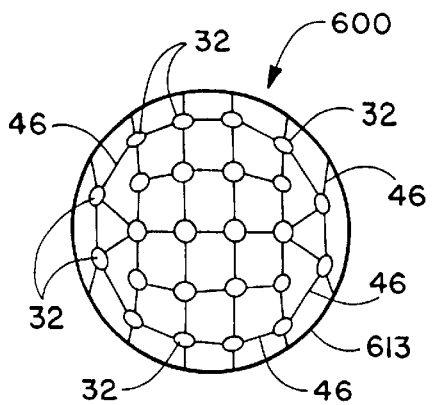
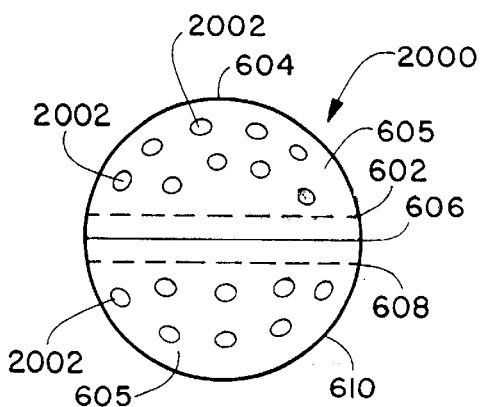
FIG. 17  FIG. 20
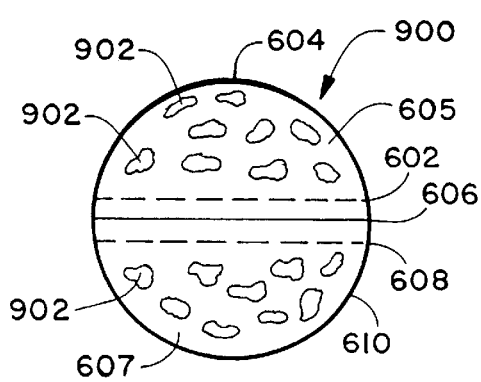
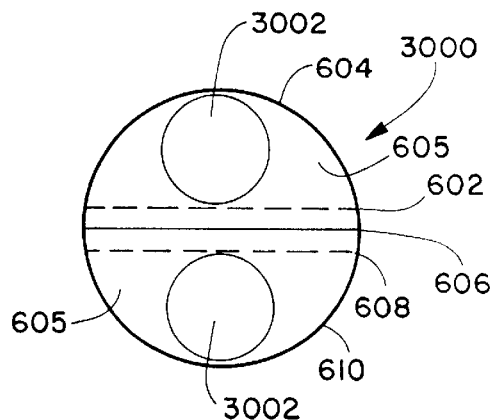
FIG. 18  FIG. 21
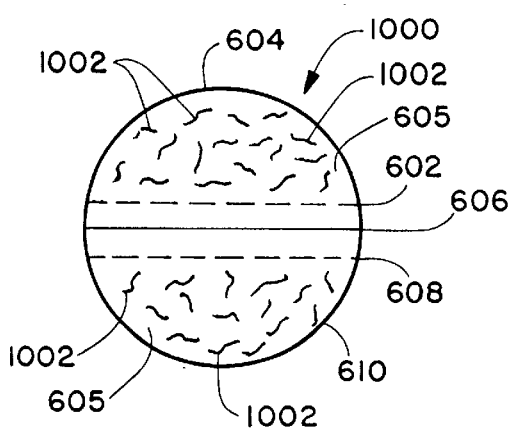
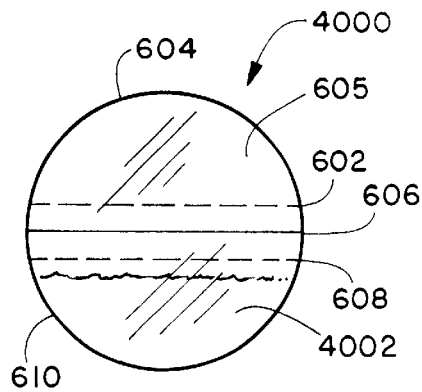
FIG. 19  FIG. 22

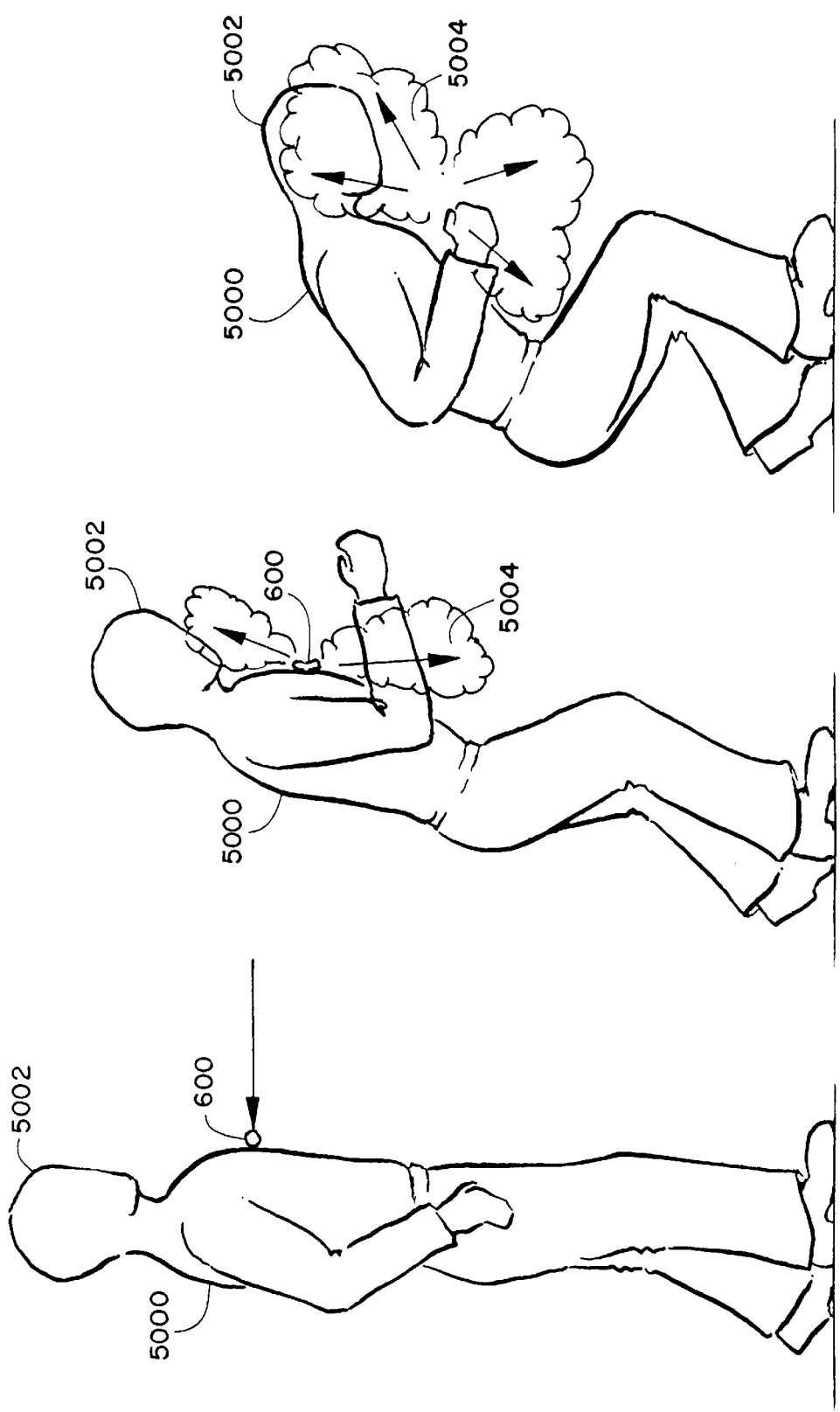

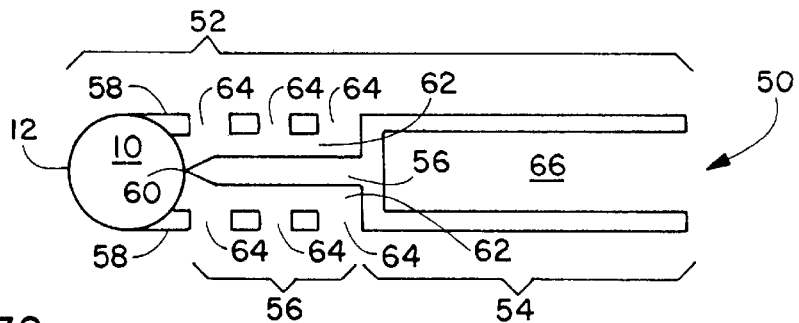
FIG. 32
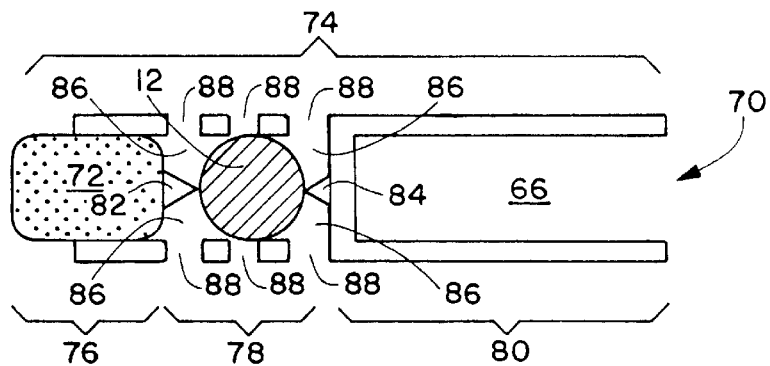
FIG. 33
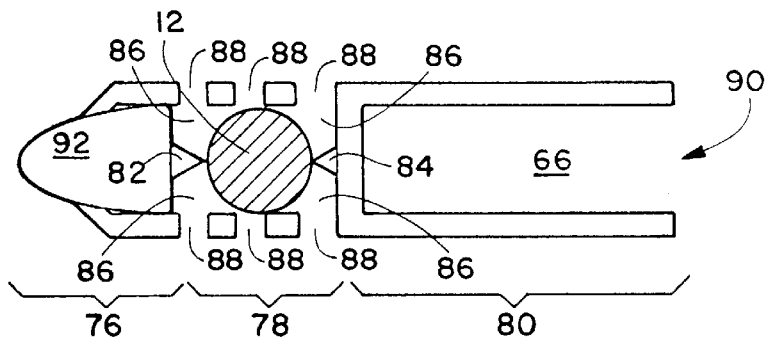
FIG. 34
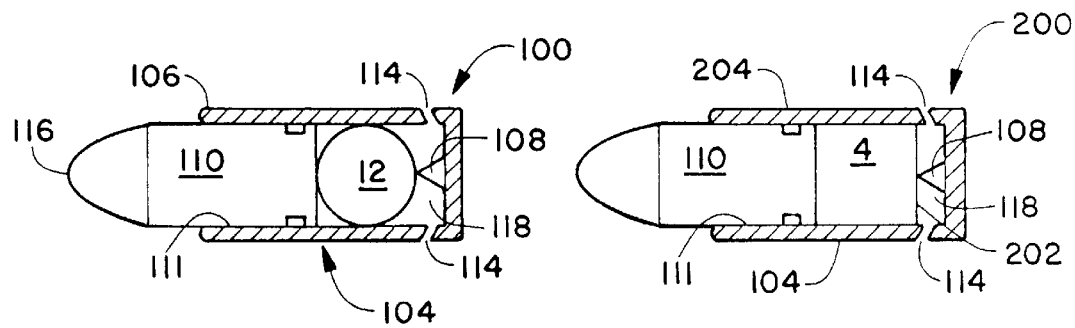
FIG. 35
FIG. 36

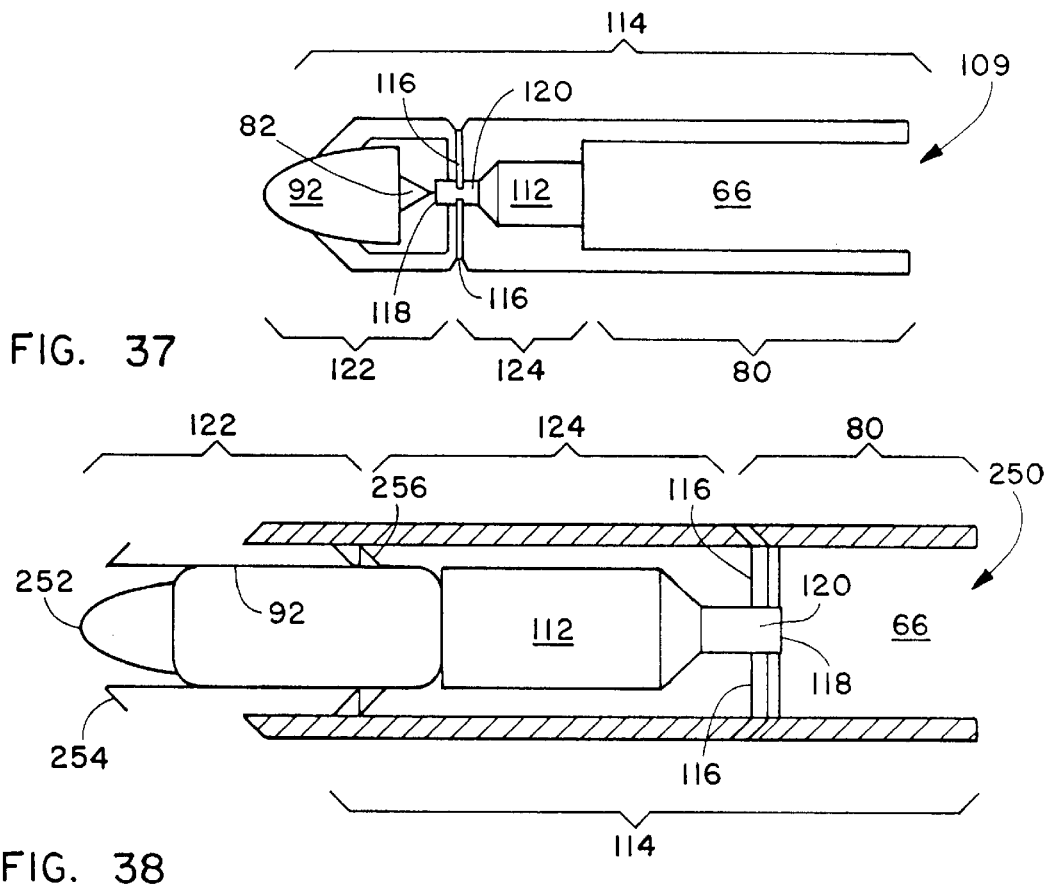
FIG. 37
FIG. 38
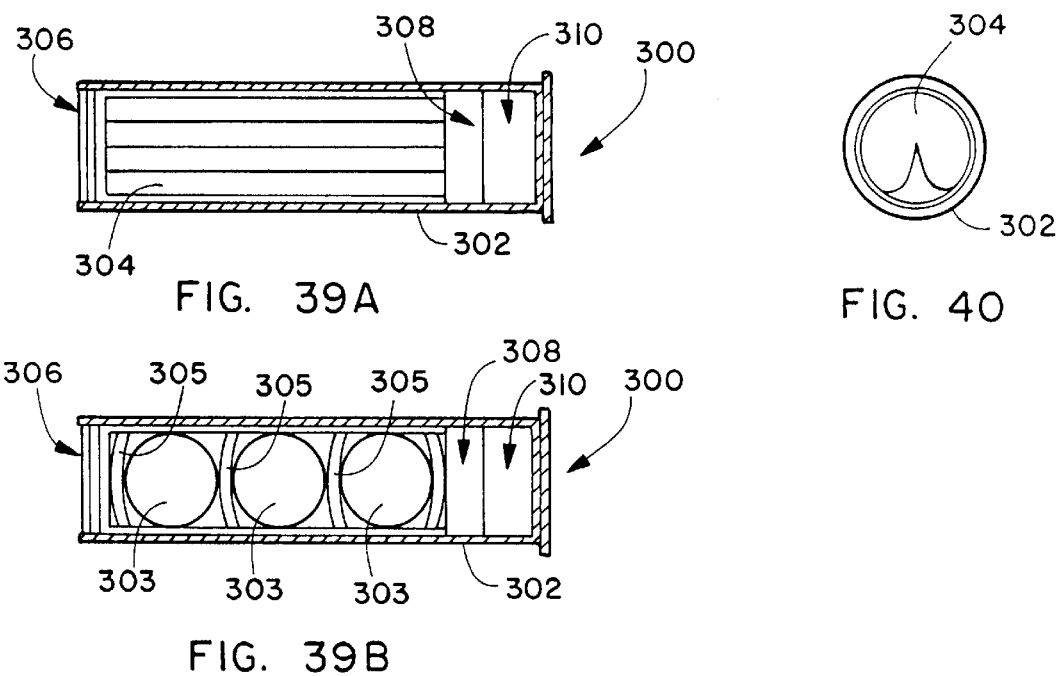
FIG. 39A
FIG. 39B
FIG. 40

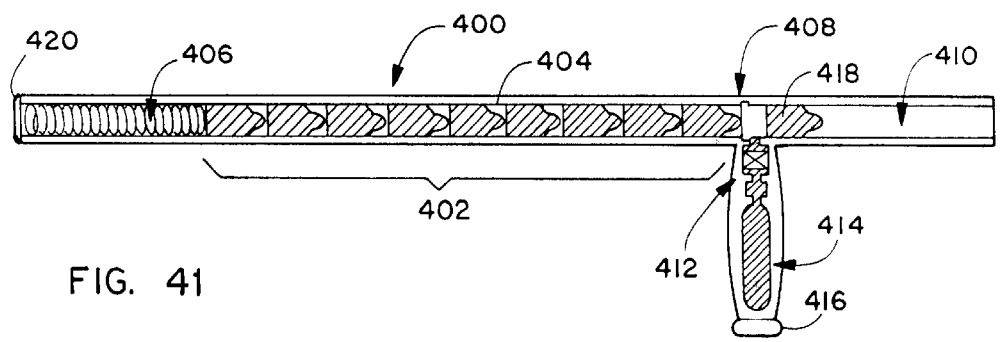
FIG. 41
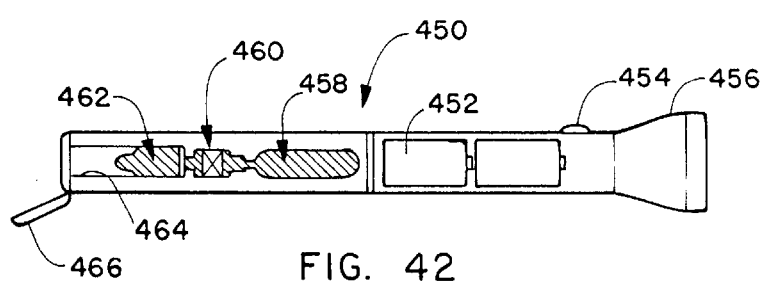
FIG. 42
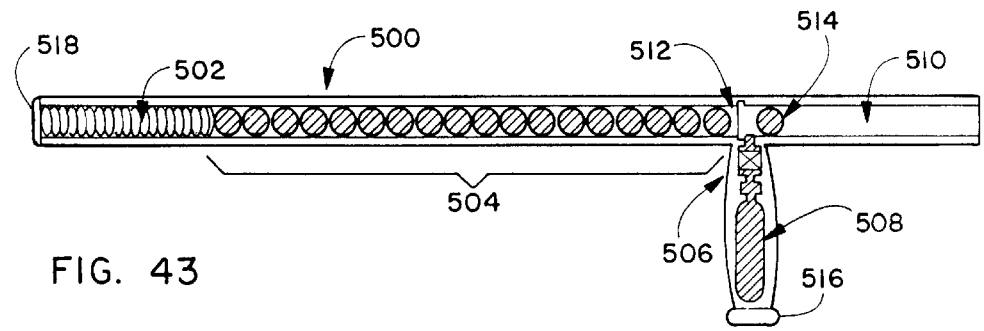
FIG. 43
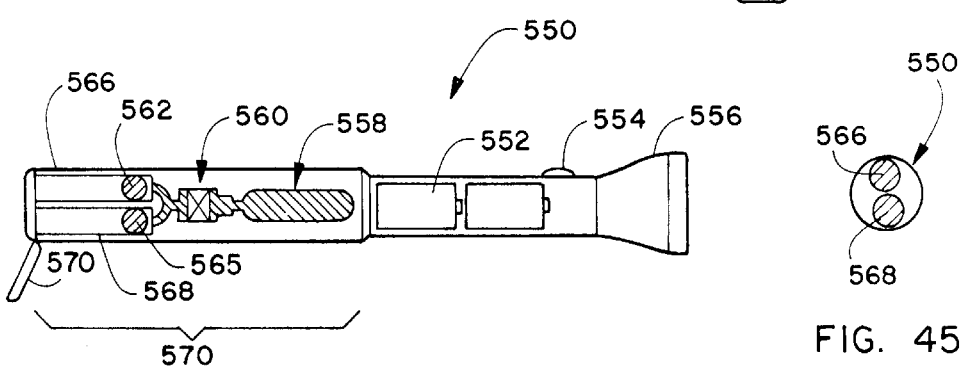
FIG. 44
FIG. 45

NON-LETHAL PROJECTILE FOR DELIVERING AN INHIBITING SUBSTANCE TO A LIVING TARGET

This application is a continuation-In-Part (CIP) of U.S. Ser. No. 08/751,709, filed Nov. 18, 1996, entitled "NON-LETHAL PROJECTILE FOR DELIVERING AN INHIBITING SUBSTANCE TO A LIVING TARGET", now U.S. Pat. No. 5,965,839, the entirety of which application and patent are hereby incorporated by reference.

BACKGROUND OF THE INVENTION

The present invention relates to a non-lethal projectile system and, more particularly to non-lethal projectiles that deliver an inhibiting and/or marking substance to a target, especially a living target. Even more particularly, the present invention relates to non-lethal projectile systems including a capsule, most preferably a generally spherical capsule, containing an inhibiting and/or marking substance, and tactical methods for using the non-lethal projectile systems in combination with a launch device in order to most effectively inhibit, impair, or disable the living target in a less-than-lethal way. The projectile systems of the present invention, upon impact with the living target, provide optimized dispersal of the inhibiting and/or marking substance on and about the target, and in particular, provide an improved mechanism for delivering the inhibiting substance to the target's face, without requiring that the projectile impact the target's face. Further, the projectile system is designed such that deployment facilitates its effectiveness by creating sufficient force, upon impact with the target, to cause the target to move his, her or its face into the dispersing substance, while at the same time experiencing impairment, or temporary disability as a result of the impact. Specifically, the non-lethal projectiles are able to be launched with sufficient non-lethal force to immediately slow and/or stop a moving target, before the inhibiting substance carried thereby affects the target. Additionally, the projectile systems of the present invention are easier and cheaper to manufacture than heretofore known projectiles, are effective at safer, stand-off distances as well as at close range distances, are easily integrated into normal officer training programs, and can be used with conventional, as well as custom, launchers.

Steadily rising crime rates have led to an increased need for technologically enhanced crime devices. There is particularly a need for non-lethal devices that are capable of at least temporarily incapacitating, slowing or inhibiting a suspected criminal and/or marking such individuals for later identification. As populations increase, the risk that a criminal will be surrounded by or in close proximity to innocent persons when officers are trying to subdue him/her also increases. Whereas non-permanently injuring an innocent bystander, while subduing a suspected criminal, is acceptable, killing the bystander is not. Thus, there is great need for non-lethal (or less-than-lethal), highly effective weapons that may be used by officers and others to slow, stop and/or mark criminals. Presently available, non-lethal devices include, for example, stun guns, mace, tear gas, pepper spray devices and similar devices that impair the vision, breathing or other physical or mental capabilities of the target.

One attempt to provide a non-lethal device for delivering an inhibiting substance is shown in U.S. Pat. No. 3,921,614, issued to Fogelgren for a COMPRESSED GAS OPERATED GUN HAVING VARIABLE UPPER AND LOWER PRESSURE LIMITS OF OPERATION, which patent is incorporated herein by reference in its entirety. Fogelgren describes a gas-operated gun and associated projectiles. In one illustrated embodiment, a projectile consists of a projectile casing that houses a structure in which a firing pin is situated so as to detonate a primary charge upon impact of the projectile with a target. Deterioration of the primary charge causes the expulsion of a load carried in a load chamber. The load chamber may contain various types of load, such as tear gas, dye, flash-powder or wadding.

Another embodiment illustrated in the Fogelgren patent consists of a projectile casing that encloses a body member, which, together with a frontal member, defines a load chamber. The body member and the frontal member are attached so as to be readily separable in flight to enable the load to escape from the load chamber and to proceed to the desired target. In this embodiment, the load is buckshot or plastic pellets.

A further embodiment of the projectile shown by Fogelgren stores a portion of a compressed gas, utilized to expel the projectile, to be used to expel a load upon striking a target. Upon firing, an outer body member separates from an inner body member thereby exposing and releasing a holding pin, which holding pin prevents premature release of the projectile's load. Apertures, from which the load is expelled upon impact, are sealed with wax to prevent expulsion of the load before the projectile impacts the target. The portion of the compressed gas used to expel the load is stored in a rear chamber of the projectile during flight, while the load is stored in a forward chamber. When the projectile strikes the target, the compressed gas is released, forcing the load through the apertures and out of the projectile.

An additional embodiment of the projectile shown by Fogelgren consists of outer members that form a container into which is fitted a breakable glass vile. Rearward of the breakable vile, padding is provided to prevent breakage of the vile upon firing of the projectile. Forward of the vile is a firing pin assembly against which the breakable vile impacts, as it shifts forward within the members forming the container, upon impact. As with the above embodiment, a holding pin, which normally prevents the breakable vial from shifting forward in the container, is expelled as an outer body member separates from an inner body member. This allows the breakable vial to shift forward upon impact, shattering the breakable glass vial against the firing pin. The breakable vile contains a load to be delivered to the target, which is delivered through apertures near the front of the projectile upon the shattering of the breakable glass vial. The vile may be charged with a compressed gas so as to provide a, charged load.

Disadvantageously, the projectiles described by Fogelgren, particularly those projectiles described that would be suitable for delivering loads such as tear gas or dye, are complicated and expensive to manufacture. The embodiment employing pressurized gas to both expel the projectile and to expel the load upon impact with the target requires a great amount of pressurized gas, that is, a sufficient quantity to both fire the projectile and to provide the portion of pressurized gas necessary to ensure expulsion of the load. In addition, such embodiment requires complicated and tedious methods to manufacture components such as a microminiature ball valve (through which the portion of the pressurized gas enters the rear chamber upon firing), wax sealer within each of the plurality of apertures and a holding pin that must fall away from the projectile in flight.

The embodiment employing the breakable glass vial is also complicated to manufacture, because it also employs a holding pin that must fall away during the flight of the projectile and employs numerous structures that must be precisely fitted together to allow them to separate during firing and in flight. This embodiment also must be carefully handled so that the breakable glass vial does not shatter while being handled by the user. This can be particularly problematic, for example, when the Fogelgren device is being used by a police officer in pursuit of a fleeing criminal (or when used by a police officer threatened by a suspected criminal). Thus, significant room for improvement still exists in the development of non-lethal projectiles.

Another approach to providing non-lethal projectiles for delivering an inhibiting substance to a living target is suggested in U.S. Pat. No. 5,254,379, issued to Kotsiopoulos, et al., for a PAINT BALL, which patent is hereby incorporated herein by reference in its entirety. The Kotsiopoulos, et al., device is directed primarily to a paint ball projectile for delivering a load (or blob) of paint to a target, and for expelling the blob of paint onto the target upon impact. The paint ball shown by Kotsiopoulos, et al. consists of a shell that fractures in a predetermined pattern upon impact with a target. The Kotsiopoulos, et al. disclosure includes a passing reference to the use of such a paint ball for delivering dyes, smoke or tear gas to a target, however, provides no mechanism for dispersing an inhibiting load upon explosion of the projectile, which is important for a non-lethal inhibiting projectile to be effective. Specifically, when the Kotsiopoulos, et al. projectile impacts the target, by-design, the load is dispersed rather locally. Thus, even if one skilled in the art were to act upon the passing reference to using tear gas in the Kotsiopoulos, et al. patent, to using tear gas, the present inventors believe that such a device would be generally ineffective because the tear gas would not be dispersed to the target's face, where it needs to be to be effective. Furthermore, as Kotsiopoulos, et al. is an unpressurized projectile, the amount of tear gas delivered would necessarily be limited to an unpressurized volume having dimensions of a paint ball. Even if this amount of tear gas were delivered to a target's face, it is unlikely that this amount of tear gas would be sufficiently effective to impair the target in a useful way.

To elaborate on the importance of localized dispersion of loads carried by the Kotsiopoulos et al. projectile, Kotsiopoulos, et al. describe a device for delivering a blob of paint to a target dictating a relatively confined dispersion, i.e., a blob of about 3 to 6 or 8 inches in diameter on the target. It would, in fact, be undesirable to widely disperse paint in the context in which the Kotsiopoulos, et al., device is used as such could be quite dangerous to the target. In contrast, for applications where an inhibiting substance is to be delivered, wide dispersion is not only desired but extremely important, particularly when the projectile impacts the target with force, and the inhibiting substance must be taken in through facial openings in order to be effective. Because firing even a non-lethal or less-than-lethal projectile at or within a few inches of a target's face is extremely dangerous, potentially causing permanent injury or death, which is, of course, contrary to the objective of non-lethal projectiles, devices such as those suggested by the teachings of Kotsiopoulos, et al., would be considered undesirable by those of skill in the art to achieve a non-lethal inhibition of a target.

Still other non-lethal projectiles are described, for example, in U.S. Pat. No. 5,009,164, issued to Grinberg (Apr. 23, 1991), U.S. Pat. No. 5,221,809 issued to Cuadros (Jun. 22, 1993) and U.S. Pat. No. 5,565,649, issued to Tougeron, et al. (Oct. 15, 1996), each of which is hereby incorporated by reference in its entirety. Grinberg describes a projectile that changes its shape upon impact with a target, thereby reducing the danger of penetration into a live target. For example, Grinberg uses a double leaf construction to facilitate rupture of the projectile upon impact. Cuadros describes a projectile that increases in size either during flight or upon impact to spread its force over a large area to provide a knock-down effect without body penetration, and Tougeron, et al., describe a self-propelled projectile intended to deliver an active substance to a living target. While each of the devices described by these patents attempts to provide a projectile that may be used to stop or slow a living target without causing lethal injury, all of the devices have proven to be less than ideal. They are complicated and expensive to manufacture, and they are variously difficult to use and unreliably effective. As a result of these problems and others, there is no widely commercially accepted non-lethal projectile in use by law enforcement or military personnel today that delivers an inhibiting substance to a target.

A significant disadvantage to the prior art devices is that none takes into consideration the need to deliver an inhibiting (or active) substance under fairly precise dispersal conditions to insure effectiveness thereof. When a target is impacted with a projectile delivering a substance thereto, to be maximally effective, the substance should disperse in a generally radial manner (or transverse to the motion of the projectile) such that the target's face is quickly and fully contacted thereby. At the same time, the projectile should, most desirably, be able to be aimed with a degree of precision so as to be able to avoid hitting the target in, for example, the face. At the same time, the dispersion of the inhibiting substance must be sufficient that, for example, a projectile impacting on a target's chest delivers inhibiting substance to the target's face where it can be effective. Unfortunately, prior art projectiles, not only rarely contemplate these problems, but also frequently fail to provide for dispersal of the inhibiting substance to a target's face after impacting the target at a remote area. Specifically, for example, while powdered inhibiting substances, in the view of the inventors, offer distinct advantages over the vast majority of prior art devices that deliver inhibiting substances to a target, no commercially viable device known to the inventors has ever been produced that addresses the problem of both accurately delivering the projectile to the target at a location remote from the target's face, and dispersing a powered inhibiting substance in a cloud-like, radial manner so as to assure that the powdered inhibiting substance reaches the target's face. Yet, there remains a significant commercial market and tactical advantage to a non-lethal or less-than-lethal projectile that can be accurately delivered to a target, impacting the target in an area other than the target's face, while at the same time providing dispersal of a powdered inhibiting substance to the target's face, where it is effective. Unfortunately, using devices heretofore known to the inventors, targets are often able to escape and/or minimize their exposure to the delivered substance.

A further disadvantage to most non-lethal weapons heretofore known is that they either operate at close ranges, for example, pepper spray canisters, or operate at long ranges, for example, rubber bullet devices, but do not operate at both close and long ranges. The inventors are not aware of any prior devices that are both sufficiently safe to be used at close range and, at the same time, effective at longer ranges, such as 10 feet or more, e.g., 20 or 30 feet or more. In particular, the close range weapons are generally not deployed with sufficient force to travel further than a few meters, and the longer range weapons generally are not "muzzle safe" in that they cannot be safely deployed at very short distances because of the chemical/explosive nature of the launching mechanism. Thus, presently, law enforcement and military personnel are required to employ two different technologies, one for close range applications, and another for long range applications. At the same time, the advantages of using a single device for both applications are numerous, and readily apparent. For example, cost is a significant factor recognized universally by governmental agencies, but perhaps even more importantly is a tactical disadvantage imposed by the use of both short range and long range non-lethal or less-than-lethal technologies. Specifically, all technologies known to the present inventors require that a user make a decision as to whether a particular situation calls for a short range non-lethal technology or a long range non-lethal technology. This requires not only spending time to assess a situation in order to determine whether non-lethal or lethal technology should be employed, but also requires expenditure of more time determining which non-lethal technology is appropriate, that is whether the situation calls for short-range technology or long-range technology. As a result, non-lethal and less-than-lethal projectiles are rarely used by law enforcement and military personnel, and, when used, are generally used only in situations where sufficient time exists for the user to make the chain of decisions necessary to first select non-lethal technology and second, to select what range of non-lethal technology is appropriate.

Cost becomes an important consideration in these tactical issues as well. Because two types of non-lethal technology must, using heretofore known technology, be available, many, if not most, law enforcement and military agencies cannot afford to fully equip their personnel. This cost constraint is further exacerbated because heretofore available non-lethal technologies, at least the ones that are effective, and thus actually useable, are complicated and highly specialized and most non-lethal devices do not offer a low-cost inert training version. Thus, training is costly and therefore, use is infrequent. As a result, even if currently available technologies could be used at both short and long ranges (thus presumably providing tactical and cost advantages), the actual costs of currently available devices is still prohibitive and therefore dictates only limited deployment.

Finally, there are currently, no projectile systems available on the market for delivering powdered substances to a living target. One reason for this unavailability is that such heretofore contemplated projectile systems are difficult to manufacture or are ineffective. While dispensing a powdered substance into a cup is straightforward, dispensing the substance into two parts of an apparatus that must subsequently be sealingly joined together, without loss of any of the powdered substance, is not so straightforward. Kotsiopoulos, et al., for example, show completely filling their paint ball through a small hole using a capillary. Such an approach, however, cannot be used to fill the Kotsiopoulos, et al. device with a powder, as it is known that powder generally cannot be conducted through a capillary as can a liquid or gas. This manufacturing difficulty combined with the aforementioned difficulties in insuring adequate dispersal of the substance, especially powdered substances, has prevented manufacturers of non-lethal projectile systems from entering the market with powder-filled devices. Today, to the knowledge of the present inventors, there is no heretofore commercially viable, non-lethal or less-than-lethal projectile for delivering a powdered inhibiting substance to a target. While powdered inhibiting substances are known, there is presently no delivery mechanism available for accurately delivering and dispersing such an inhibiting substance in a non-lethal, short or long range manner.

Thus, as will be appreciated by those of skill in the art, significant improvements are needed in non-lethal projectiles for delivering inhibiting and/or marking substances to targets, especially to living targets. For example, muzzle safe projectile systems that provide optimum dispersal of the substances contained therein are desirable. Further, projectile systems that may be readily incorporated into existing officer training programs would be advantageous, as such systems would insure that officers could be quickly, cost effectively, and easily trained in the use of the system, which, in turn would be of particular advantage to the officer when attempting to use the system under stressful situations, as would normally be the case. Additionally, non-lethal projectile systems designed to impact a living target in such a way as to actually facilitate the effectiveness of the system are desirable, as are methods of employing such projectile systems to maximize effectiveness thereof.

SUMMARY OF THE INVENTION

The present invention advantageously addresses the above-identified needs, as well as other needs, by providing a non-lethal or less-than-lethal projectile system for delivering a substance to a target, especially a living target, such as a human or animal target, wherein the projectile system is specially designed to maximize its effectiveness including by providing a kinetic impact against the target at a first location on or near the target combined with optimum dispersal of the substance on and/or about the target at a second location. In one aspect, the projectile system employs an inhibiting/impairing substance and/or a marking substance, such as a colored dye or chemical compound having a particularly offensive odor, to slow/stop and/or mark for identification (either by a dye or through attendant bruising of the target as a result of the kinetic impact), a living target. In another aspect, the projectile system includes a capsule filled to greater than 50%, preferably to 75% to 99%, more preferably to 85% to 95% and most preferably to about 90%, of its volume with an inhibiting/ impairing substance and/or marking substance and/or inert substance, such that upon impact with a target, the substance is radially (or transversely to the motion of the projectile system) dispersed on and/or about the target. In a still further aspect, the present invention provides a projectile system that operates by impacting a living target with sufficient force to cause the target to move or hunch towards the projectile thereby bringing his/her face more proximate to the nearly simultaneously dispersing cloud of inhibiting/ marking substance.

In another aspect, the present invention advantageously is filled with any of an inhibiting substance, such as oleoresin capsicum, a marking or tagging substance, such as a colored dye, and/or an inert substance, such as talcum, or any combination thereof. For example, it is contemplated herein, by the present inventors, that a projectile, system in accordance with one embodiment could include a combination of oleoresin capsicum and talcum, at a desired ratio, and to an appropriate fill level in order to improve dispersion of and the effect of the oleoresin capsicum to a desired level. Alternatively, a combination of oleoresin capsicum, and/or other inhibiting substance, and a colored dye, and/or other marking substance, may be employed to simultaneously incapacitate the target and mark him/her for later identification. In yet another alternative, it may be desirable to employ only a marking substance or only an inert substance, such as talcum, in the projectile system, such as when the projectile system is being used for training purposes. In a still further embodiment, the projectile system may have no substance contained therein. In this embodiment, the projectile system may be used to mark a living target by bruising him/her upon impact.

In a particular embodiment, the projectile system comprises a spherical capsule separable into two about equal halves, wherein the halves contain a powdered impairing substance sufficient in amount so that the projectile is at least greater than 50% full and preferably between about 60% and 99% full, for example, from between 75% and 95%, for example, about 90% filled with a powdered substance and wherein, to facilitate manufacture of the projectile system, the powdered substance within each half is compressed and/or retained therein by a thin membrane, for example a paper foil, which contacts the inhibiting substance during assembly of the spherical capsule. In this preferred embodiment, the thin membrane is preferably sufficiently strong to retain the desired substance within the capsule as it is manufactured or assembled, yet frangible enough to readily rupture subsequent sealing of the capsule and prior to, or at least simultaneously with, impact with the target. The inhibiting substance may, for example, contain at least 1% oleoresin capsicum, e.g., between 3% and 30%, e.g., between 5% and 20%, with a remainder of the inhibiting substance being either an inert substance or a marking substance or a different inhibiting substance, such as tear gas powder. Similarly, more than one inhibiting substance may be combined to provide a total of about 1% to about 30% or more inhibiting substance in the capsule.

In a further embodiment, the projectile system comprises the spherical capsule separable into two about equal halves, wherein the halves contain the powdered impairing substance sufficient in amount so that the projectile is at least greater than 50% full and preferably is between about 60% and 99% full, for example, from between 75% and 95%, e.g. about 90% filled with the powdered substance and wherein, to facilitate manufacture of the projectile system, the powdered substance within each half is compacted using, for example, a mandrel, whereby respective portions of the powdered substance each remain packed within a respective half during assembly of the halves into a spherical (or other suitably shaped) capsule. As indicated above, the inhibiting substance may, for example, contain at least 1% oleoresin capsicum, e.g., between 3% and 30%, e.g., between 5% and 20%, with a remainder of the powdered substance being an inert substance, a marking substance or a different inhibiting substance.

In some variations, the inhibiting substance may include fragments of solid material to enhance dispersion of the inhibiting substance. For example crushed walnut shells, rice, wood shavings, metal particles such as metal powder or metal filings, or the like may be added to the inhibiting substance to help carry the inhibiting substance away from a point of impact of the projectile against the target. The solid material, having a greater density and mass than the powdered inhibiting substance, inert substance or marking substance, tends to project further from the point of impact, there by facilitating dispersion of the substance as it is carried by the solid material.

In yet other variations, a weighting substance, for example metal balls, metal shot metal balls wood pieces or other high mass and/or high density materials, such as higher density powders, can be added to the inhibiting substance to not only facilitate dispersion of a powdered substance, but to also increase the kinetic impact of the projectile against the target, thus enhancing the initial impact effectivity of the projectile. This variation can be used to enhance the already synergistic combination of kinetic impact and inhibiting substance, which act, for example, serially, in order to initially stun a target with the kinetic impact, and then debilitate the target with the inhibiting substance. Alternatively, this variation may be employed, where one or more targets are located behind a glass or similar barrier, to break the glass, thereby providing access to other targets.

In use, these higher kinetic force projectiles may, or optionally may not, contain an inhibiting substance. And, if such high kinetic impact projectiles do not contain an inhibiting substance, such projectiles may optionally be, for example, solid, rather than capsules, and thus may be made from solid steel, rubber, glass, plastic, or the like. These kinetic projectiles may be used alone or intermixed with projectiles containing inhibiting substance. When intermixed, a pattern of one kinetic projectile for every X inhibiting projectiles may be utilized, where X may be, for example, from between 0.1 and 10. Or, kinetic projectiles may be used to initially subdue a target, followed by inhibiting projectiles to impair the target. In addition, these kinetic projectiles may be arranged such that successive projectiles carry an increasing kinetic impact, so that an initial impact would be a of relatively low kinetic force, and successive kinetic impacts would be of relatively higher forces. In this approach, kinetic capsules may be intermixed with inhibiting capsules, or may themselves carry an inhibiting substance. Also, each successive round may be of increasing kinetic force, or a group of projectiles at a given kinetic force may be fired before a subsequent group of high kinetic force.

In further variations, a marking agent, dye, or taggant can be added to the inhibiting substance in order to provide a mechanism for identifying the target at a later time. This feature of this variation may be particularly useful in law enforcement applications, where evidence gathering may be enhanced if the target can be marked. By combining a marking agent with an inhibiting substance a significant synergism is achieved. In another aspect, marking can be effected by bruising of the target due to the kinetic impact of the projectile against the target.

In yet a further variation, a powdered inhibiting substance can be combined with a liquid or gas irritant, or other agent to be delivered. The liquid or gas, and the powdered irritant can be carried in separate chambers, in for example, separate halves of the projectile using the membranes described herein to contain the powdered inhibiting substance and the other agent, keeping them separated, if needed. If a liquid or gas is contained by one or both of the membranes, such membranes can be made, for example out of plastic, vinyl, rubber or the like.

In an alternative embodiment, the capsule of the projectile system is constructed to facilitate rupture thereof upon impact with a target. In one aspect, the capsule has a plurality of structurally weakening dimples within its exterior surface, and, more particularly, the structurally weakening dimples have a minimum depth of about 15%, preferably about 20%–75% and most preferably about 30% to 60% of the thickness of the capsule. Advantageously, these dimples also provide enhanced aerodynamic qualities, thus serving a dual and synergistic combination of uses. Alternatively, the capsule employs a matrix of global surface scoring in its exterior and/or interior surface to provide a weakened surface and facilitate rupture upon impact. Further alternatively, a combination of dimples, with surface scoring connecting the dimples may be employed to provide both enhanced aerodynamic qualities and to facilitate rupturing of the capsule upon impact.

In another embodiment, the present invention includes a method of assembling the projectile system herein comprising the steps of filling each half of the capsule with a portion of the substance to be delivered to the target, covering the substance within each half of the capsule with a thin membrane to retain the substance therein and sealingly attaching the two halves to one another. In a particular embodiment, the two halves of the capsule are welded to one another using ultrasound, glue or a suitable solvent. Or alternatively, the two halves may be formed with interlocking flanges, so as to snap together without need for the use of solvent, glue or ultrasonic welding, or so as to provide a mechanical closure, while, for example, a solvent or glue is used to provide hermeticity to the capsule, thereby preventing contamination of, for example, a powder irritant with, for example, water vapor, which can cause clumping of the powder irritant, and thus reduce the ability of the powder irritant to disperse. In a still further embodiment, the sealed capsule is shaken or otherwise subjected to forces sufficient to rupture the membranes therein, after sealing thereof.

In another embodiment, the present invention includes a method of assembling the projectile system herein comprising the steps of filling each half of the capsule with a portion of the substance to be delivered to the target, compressing (or tamping) the substance within each half, such as with a mandrel, to retain the substance therein, and sealingly attaching the two halves to one another. As above, in a particular embodiment, the two halves of the capsule are welded to one another using ultrasound, glue of a suitable solvent. Or alternatively, the two halves may be formed with interlocking flanges, so as to snap together without need for the use of solvent, glue or ultrasonic welding, or so as to provide a mechanical closure, while, for example, a solvent or glue is used to provide hermeticity to the capsule, thereby preventing contamination of, for example, a powder irritant with, for example, water vapor, which can cause clumping of the powder irritant, and thus reduce the ability of the powder irritant to disperse.

Advantageously, the structure provided by the embodiments herein provides a highly accurate, muzzle safe projectile. By making available an option of using existing paint ball launcher technology, the inventors provide not only a highly accurate launch device, but one that is readily available, and extremely cost effective for law enforcement agencies and military branches.

Advantageously, present training programs for law enforcement and military personnel include training such personnel to target a target's chest area when using lethal weaponry. Use of the above methodology with the above non-lethal or less-than-lethal projectile does not change this tactic, and thus, both the above method and above projectile are readily deployable with and readily compatible with the training of current law enforcement and military personnel.

In a variation, rapid firing of projectiles, such as for example from an automatic or semi-automatic weapon, in accordance with the embodiments herein can be used to enhance both kinetid stunning, and impairing of the target with the inhibiting substance. Such rapid firing can be effected with projectiles having successively more concentrated fills of inhibiting substance, such as 5%, 10%, 15%, 20% and possibly higher mixes of inhibiting powder with inert powder, in order to initially deliver a minimum of inhibiting substance, gradually increasing strength of the inhibiting substance with successive projectiles. Several projectiles at each strength may be used followed by several at a next higher strength or each successive projectile may contain substance at an increasing strength or any combination of strengths may be employed.

Whether or not projectiles with successively more concentrated fills are employed, or, for example, a single fill concentration is employed, the rapid firing of projectiles at a target offers an advantage in that a larger more diffuse cloud of inhibiting substance is created with each impact of a projectile against or near the target. Thus, in effect, successively greater amounts of inhibiting substance are delivered to the target with each successively impacting, rapidly rifled projectile.

When rapid firing is employed, a pattern of projectile impacts beginning near a target's shoulder, and moving toward a target's groin may be particularly advantageous at causing the target to move his or her face into the cloud of powdered inhibiting substance, or irritant, as he or she hunches over and turns to protect him or herself from the patten of projectile impacts. Similarly, a pattern beginning near the target's groin, and moving toward the target's shoulder may also be effective and advantageous. This latter approach particularly lends itself to use when an aggressive target may ultimately need to be targeted in an extremely aggressive manner, such as at the target's head. Specifically, a pattern of projectile impacts beginning near a target's groin can move up the target's torso, and, if needed, terminate with projectile impacts on or near the target's head. The inventors envision that the targeting of a target's head be used only in extreme cases, perhaps only in cases that would justify the use of deadly force.

Thus, in yet a further embodiment, the invention contemplated herein includes a method of impairing a human target by impacting the target's upper torso, especially upper chest area, with a projectile system in accordance herewith, with sufficient force to cause the target's upper torso to move posteriorly and the target's head to move anteriorly that is, to hunch forward towards the projectile. This effect is enhanced by the target's natural propensity to close around a point of impact, and to protect a wounded area. Upon impact with the target, the capsule ruptures causing a radial dispersion of the substance contained therein. And thus, as the target's head moves anteriorly, it moves toward a cloud of radially dispersing substance. As a result, the substance comes in contact with the target's face, and, especially, the mucous membranes, such as, of the target's airway, thereby maximizing the inhibiting effects of the substance. As a further advantage of the present method, the target will naturally be caused to inhale as his or her face is moved anteriorly, and, thus, the target is forced to inhale the substance from the cloud, causing a significantly enhanced effectivity as compared to commercially available device of which the present inventors are aware.

In another aspect of the present invention, frangible capsules, in accordance herewith, containing breaker balls, such as steel balls, ceramic balls, glass balls or other materials having enhanced mass/weight characteristics, may be fired initially, for example, from a rapid fire rifle, so as to open a passage through a barrier, for example glass, acrylic or similar glass-like material, followed by firing of one or more projectiles filled with an inhibiting substance, i.e., irritant. This variation provides a particular advantage in situations such as car chases, where a target can be impaired while stopped momentarily in traffic as he or she attempts to elude law enforcement personnel. Specifically, while stopped, an officer can fire a series of breaker balls followed by projectiles containing inhibiting substance. The use of breaker balls can also, for example, be useful in situations such as hostage situations where a target is located inside a building behind glass that first needs to be broken before inhibiting projectiles can be fired into the building toward the target. Most advantageously, because the capsules containing the breaker balls are frangible and break upon impact with the glass-like barrier, they are less dangerous to the living targets than would be a non-encapsulated breaker ball.

In a further method, the projectiles of the above embodiments need not strike the target to be effective. Instead the projectiles can be aimed at a wall, a ceiling, or at another structure near, especially above, the target, whether or not the target is not visible. Specifically, for example, a target hiding behind a wall can be effectively inhibited by the widely dispersed cloud of inhibiting substance, e.g., powder, produced upon impact of the projectile against a nearby structure. This method is useful, for example, in armed robbery situations, prison riots, cell extractions, and the like, where targets may be intentionally hiding from law enforcement or military personnel.

Thus, it is a feature of the present invention to provide a projectile system for delivering a desired substance, especially an impairing/inhibiting substance and/or a marking substance to a target, which projectile system provides optimum dispersal, and therefore effectiveness, of the substance(s) on and/or about the target.

It is a further feature of the present invention to provide a projectile system that is easily manufactured and readily deployed.

It is a still further feature of the present invention to provide a projectile system, the use of which may be easily incorporated into an existing armed officer training program.

It is yet another feature of the present invention to provide a method of non-lethally impairing a living target using the projectile system herein.

BRIEF DESCRIPTION OF THE DRAWINGS

The above and other aspects, features and advantages of the present invention will be more apparent from the following more particular description thereof, presented in conjunction with the following drawings wherein:

FIG. 1 is a side view of a projectile for delivering an inhibiting substance, such as oleoresin capsicum, tear gas or the like, to a living target, such as a human target, in accordance with one embodiment of the present invention;

FIG. 2 is a cross-sectional side view of two halves of the capsule of a projectile system in accordance herewith, illustrating the use of membranes, within each half, to retain the substance contained therein, during assembly;

FIG. 3 is a cross-sectional side view of the two capsule halves of FIG. 2 in a rotated position as they would be during assembly, when brought together;

FIG. 4 is a cross-sectional side view of a sealed capsule of a projectile system in accordance herewith, illustrating the membranes employed to retain the substance within the capsule;

FIG. 17 is a side-view of a projectile system made in accordance with a still further variation of the system of FIG. 1, wherein the capsule is modified to include both a matrix pattern of exterior global scoring and a pattern of dimples;

FIG. 18 is a cross-sectional view of a further variation of the projectile systems described herein, wherein solid material, such as walnut shells or rice, has been added to the substance contained within the capsule;

FIG. 19 is a cross-sectional view of another variation of the projectile systems described herein, wherein metal filings have been added to the substance contained within the capsule;

FIG. 20 is a cross-sectional view of still another variation of the projectile systems described herein, wherein metal shot has been added to the substance contained within the capsule;

FIG. 21 is a cross-sectional view of a still further variation of the projectile systems described herein, wherein metal balls have been added to the substance contained within the capsule;

FIG. 22 is a cross-sectional view of a variation of the projectile systems described herein, wherein a liquid or gas substance is contained within one half of the capsule and a powdered substance is contained in the other half of the capsule;

FIGS. 25, 26 and 27 are a sequence of profile views of a human target as he/she is impacted with a projectile system in accordance herewith;

FIG. 32 is a cross-sectional view of a projectile for delivering an inhibiting substance to a target in accordance with another embodiment of the present invention, wherein the embodiment of FIG. 1 is employed to carry the inhibiting substance, and a stabilizer portion is employed to increase range;

FIG. 33 is a cross-sectional view of a projectile made in accordance with one variation of the projectile of FIG. 32, wherein a plunger is employed to explode a capsule containing the inhibiting substance;

FIG. 34 is a cross-sectional view of a projectile made in accordance with another variation of the projectile of FIG. 32, wherein the plunger employed to explode the capsule containing the inhibiting substance is aerodynamically-shaped;

FIG. 35 is a cross-sectional view of a projectile made in accordance with a further variation o of the projectile of FIG. 32, wherein the plunger is employed to explode a capsule containing the inhibiting substance, and wherein an atomization matrix made up of forward pointing exit orifices is located at a rearward end of the projectile in order to increase a spray pattern area on the target;

FIG. 36 is a cross-sectional view of a projectile made in accordance with a variation of the projectile of FIG. 35, wherein the plunger is employed to puncture a membrane behind which the inhibiting substance is encapsulated;

FIG. 37 is a cross-sectional view of a projectile for delivering an inhibiting substance to a living target in accordance with a further embodiment of the present invention, wherein a pressurized canister is employed to carry the inhibiting substance, and a stabilizer section is employed to increase range;

FIG. 38 is a cross-sectional view of the projectile for delivering an inhibiting substance to a living target, wherein a pressurized canister is employed to carry the inhibiting substance, and a stabilizer section is employed to increase range, and wherein the projectile employs an adhesive material and a mechanical attachment system to attach the projectile to the target during delivery of the inhibiting substance to the target and further employs forward pointing exit orifices to increase a spray pattern area on the target;

FIG. 39A is a cross-sectional view of a projectile for delivering an inhibiting substance to a living target in accordance with an additional embodiment of the present invention, wherein a twelve-gauge shotgun shell is packed with a rosin bag (or alternatively a spherical capsule) that contains an inhibiting substance, such as powdered or liquid oleoresin capsicum;

FIG. 39B is a cross-sectional view of an alternative of the projectile of FIG. 39A, wherein the twelve-gauge shotgun shell is packed with one or more spherical capsules, for example, as illustrated in FIG. 1, which capsules preferably contain an inhibiting substance, such as oleoresin capsicum.

FIG. 40 is an end cross-sectional view of the projectile for delivering an inhibiting substance in accordance with the additional embodiment of FIG. 39A;

FIG. 41 is a cross-sectional view of a launch device useable in combination with the projectile for delivering an inhibiting substance to a living target in accordance with an additional embodiment of the present invention, wherein the launch device assumes the form of a PR24 police baton thus allowing dual use of the launch device, i.e., as a launch device and as a PR24 police baton;

FIG. 42 is a cross-sectional view of a launch device suitably used with the projectile for delivering an inhibiting substance to a living target in accordance with another embodiment of the present invention, wherein the launch device assumes the form of a flashlight thus allowing dual use of the launch device, i.e., as a launch device and as a flashlight;

FIG. 43 is a cross-sectional view of an adaptation of the launch device of FIG. 41 for delivering ball-type projectiles;

FIG. 44 is a side cross-sectional view of an adaptation of the launch device of FIG. 42 for delivering ball-type projectiles, wherein a plurality of barrels, such as two, are employed so as to allow for the firing of multiple projectiles without reloading; and FIG. 45 is an end cross-sectional view of the adaptation of the launch device of FIG. 44 illustrating the plurality of barrels.

Corresponding reference characters indicate corresponding components throughout the several views of the drawings.

DETAILED DESCRIPTION OF THE PREFERRED EMBODIMENTS

Figure 5:
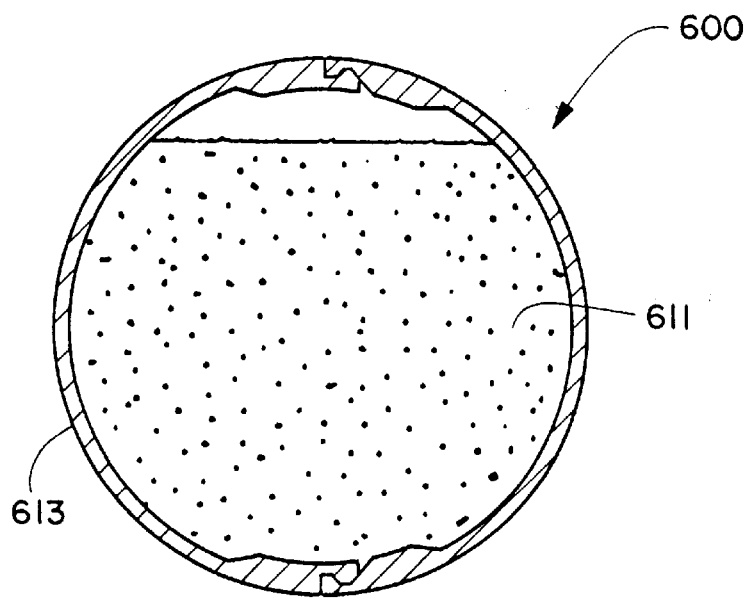
FIG. 5 is a cross-sectional view of a fully assembled capsule in accordance with preferred embodiments herein, illustrating optimal fill of the capsule with a substance to be delivered to a living target.

The following description of the presently contemplated best mode of practicing the invention is not to be taken in a limiting sense, but is made merely for the purpose of describing the general principles of the invention. The scope of the invention should be determined with reference to the claims.

As used herein, the term "projectile system" refers generally to the entire projectile apparatus of the present invention that travels to the target. For example, in all embodiments contemplated herein, the projectile system at least includes a capsule (or container portion) having a hollow space within which is contained a substance for delivery to the target. In some embodiments (discussed near the end this patent document), the projectile system includes additional apparatus associated with the capsule, for example a stabilizer body, which apparatus travels with the capsule to the target. It is presently preferred by the inventors however, to omit the stabilizer body, and employ only the capsule. The terms "capsule", "casing" and "shell" are used interchangeably herein to refer to the container portion of the projectile system within which the substance is contained, whether or not a deliverable substance is actually contained therein.

Referring now to FIG. 1, a side view is shown of a projectile 10 for delivering an inhibiting substance, such as, pepper spray, oleoresin capsicum powder, tear gas, smoke or the like, to a living target, such as a human target, in accordance with one embodiment of the present invention. Most preferably, the inhibiting substance comprises finely powdered oleoresin capsicum, such as may be purchased from Defense Technology of America in Casper, Wyo. (for example, Blast Agent oleoresin capsicum #T14, #T16, #T21 and/or #T23). In the present embodiment, the oleoresin capsicum powder (referred to with respect to the present embodiment as "powder") is preferably purchased at a concentration of at least about 0.5%, e.g., between 1% and 30%, e.g., 3% and 10%, e.g. about 5% by volume. Alternatively, powder may be diluted, to a desired concentration, by mixing with an inert powdered substance, such as talcum or corn starch. In other embodiments, the projectile 10 may also be used to deliver other substances such as marking substances, including for example, dyes or paint, or the like, to a living or an inanimate target, and may also be used to deliver inert substances, such as talcum powder. In still further embodiments, the projectile may be used to deliver both inhibiting and marking substances to the target.

The projectile 10, in accordance with the present embodiment, includes an inhibiting substance 11 encapsulated within a plastic, gelatinous or similar material capsule 12. The capsule 12, or shell, may be made from various known substances, such as acrylic, vinyl, plastic, polystyrene and/or other polymers, sodium alginate, calcium chloride, coated alginate and/or polyvinyl alginate (PVA).

In a preferred embodiment, the projectile systems contemplated herein include a generally spherical hollow capsule, preferably formed of a polymer substance, for example and without limitation, polystyrene, polyvinyl, vinyl or acrylic. Preferably, the outer diameter of the spherical capsule 12, or shell, is from between about 1.0 cm and 5.0 cm, e.g., 1.8 cm. The inner-diameter of the shell 12 (which defines the volume in which the substance is carried) preferably has a diameter of from between about 0.3 cm and 5.0 cm, e.g., 1.7 cm. In preferred embodiments described in detail herein, the capsule 12 is filled to at least greater than 50%, preferably 60% to less than 100%, more preferably 85% to 95%, and most preferably to about 90%, of its volume with a substance, for example an inhibiting and/or marking substance, to be delivered to a target, for example a human target. The capsule 12 is preferably formed, in halves, by injection molding or by being hot pressed; however other methods are also suitable. For example, the spherical capsules of U.S. Pat. No. 5,254,379, incorporated herein by reference, (hereinafter the '379 patent) are formed using a carefully temperature controlled draw of polystyrene. Production of the capsule of the '379 patent in this fashion can be time consuming and, where being manufactured for the purpose of delivering paint to a target, requires careful attention to feed rates and maintenance of temperature differences between injection feeds of the paint and forming of the capsules. In contrast, and as discussed further herein, the preferred capsules of the present invention may be quickly formed, filled and sealed at very high production rates, in part, because the capsules are formed in halves, then appropriately filled, joined and sealed.

It has been discovered, by the present inventors, that the effectiveness of projectile systems employing capsules to deliver powdered non-lethal substances, such as powdered oleoresin capsicum, to a target are maximized by filling the capsules to at least greater than 50%, preferably 60% to less than 100%, more preferably 85% to 95% of their maximum volume, and most preferably to about 90% of their maximum volume. This is somewhat counterintuitive as it would be expected that a capsule that is full or nearly full of a powdered substance would, upon rupture, disperse its contents in a rather small, local area (i.e., as a lump or blob) and therefore be of minimal effectiveness unless facial openings of a target were directly targeted. However, it would also be expected that a capsule that is only about half-full or less with a powdered substance would disperse more effectively, which is not proven to be the case.

For example, capsule fills of less than about 60% have been found by the inventors to not disperse with sufficient transverse or radial motion to reach the critical face region of the target but rather provide only local application of the inhibiting substance, i.e., produce only a lump or blob of powder on the target. Similarly, and as expected, where capsule fills are full, i.e., approach 100% of their total volume, the substances do adhere to themselves and clump, moving as though they were a large particle rather than dispersing in a radial, cloud-like fashion.

Thus, the present inventors discovery of an optimal fill range, i.e., at least greater than 50% and preferably from between 60% and less than 100%, e.g., between 75% and 95%, e.g., 90%, represents a significant improvement, one that enables the use of powdered inhibiting substances, for the first time known to the inventors, in a commercially viable non-lethal or less-than-lethal projectile. For the reasons above, this optimal fill range further represents an unexpected result. However, at the same time, this optimal fill range poses a different problem, which is addressed herein below, that is, how to fill two halves of a spherical capsule so that a resultant capsule has the optimal fill range, without significant spillage of the substance contained therein during closure of the two capsule halves.

To further facilitate maximum dispersal of the contents of the capsule in a non-lethal projectile system, the inhibiting substance should be formulated so that it is not strongly cohesive. For example, where a liquid substance is employed, it should be selected to have very low surface tension (or should be placed under pressure), and where powders are concerned, highly structured surfaces are to be avoided. Thus, for example corn starch is a smooth surfaced powder that will readily disperse in a cloud-like manner; whereas other powders may require micro-grinding to remove structured surfaces. Various substances, well known to those of skill in the art, may be used in the present projectile systems. Particularly preferred herein, however, is powdered oleoresin capsicum, which is a pepper-derived substance, i.e., essentially a food product. When powdered oleoresin capsicum is delivered to a target, in accordance with the apparatus and methods described herein, the target inhales the substance into its lungs, which not only is painful to the target but also results in a temporary inability to breathe effectively. Although the inability to breathe is temporary, it is of sufficient duration to cause panic in the individual, thereby providing adequate time for apprehension. Furthermore, like the liquid form, powdered oleoresin capsicum causes significant irritation and pain when it contacts the mucous membranes, such as for example, eyes, nose, mouth or throat, of a living target. Again, powdered oleoresin capsicum, preferred for use herein, may be purchased from Defense Technology of America in Casper, Wyo. (for example,. Blast Agent oleoresin capsicum #T14, #T16, #T21 and/or #T23).

As mentioned above, the use of optimal fills with powdered inhibiting substances in a spherical projectile poses a serious practical problem, i.e., how to fill two halves of a spherical capsule with enough powder so that, when assembled the capsule contains an optimal fill, without spillage of the powder. As one of skill will appreciate, spillage is a problem in nearly any environment, but when the material spilled is as inhibiting as oleoresin capsicum powder, the elimination of such spillage becomes important to the safety of persons performing the assembly. Furthermore, as those of skill will readily appreciate, where a liquid substance may be dispensed into a capsule using a capillary, a powdered substance cannot be so dispensed with any sort of accuracy. Thus, the inventors herein have had to devise a method of filling capsules to greater than 50% of their volume, with a powdered substance, in accordance herewith.

Referring then to FIGS. 2–6, illustrated are the stages of two preferred assembly methods of a projectile system (600), in accordance herewith, comprising a spherical capsule (613) containing a powdered substance (605, 607 & 611). FIG. 2 shows cross sectional views of the two halves of a capsule 604, 610 in accordance with one embodiment of the present invention. As illustrated in FIGS. 2–4, the problem of spillage during assembly is overcome in this embodiment by employing a thin membrane 602, 608, within each half of the capsule 604, 610 after the each is filled to a desired level with a powdered substance 605, 607 (the two portion of substance 605, 607 together constituting the optimal fill of the capsule 613). The membranes 602, 608 retain respective portions of the substance 605, 607 within each half 604, 610 to facilitate assembly of the halves 604, 610 to form the capsule 613 without spilling the substance 605, 607 during assembly. Each half 604, 610 is preferably a generally hemispherical, symmetrical half of the capsule.

FIG. 2, then, illustrates the two capsule halves 604, 610 after being filled to their desired level with the powdered substance 605, 607 and then covered with a membrane 602, 608. Next, as can be seen in FIG. 3, the two halves 604, 610 are rotated toward one another and brought together so that a sphere is formed. FIG. 4 shows the capsule 613 after the halves are joined to one another. Upon joining of the two halves 604, 610 into a closed spherical capsule 613, the capsule 613 is then, optionally, sealed along the point of joining (606 FIGS. 18–22) by, for example, ultrasound welding or use of a glue or solvent. In a preferred embodiments, the capsule 613 is hermetically sealed along the joining seam, such that moisture and/or other contaminants cannot enter the capsule, spoiling its contents. In a still further preferred aspect, the sealed capsule of the projectile system 600 FIG. 4 is shaken or otherwise subjected to sufficient force to cause rupture of the membranes within the capsule 613, such that the substance 611 within the capsule becomes mixed and moves relatively freely within the capsule 613. It is noted that the glue/solvent is not illustrated in FIGS. 4 or 5 because they are cut away views of the projectile system 613. Also, not illustrated are the remnants of the membranes 602, 608 in FIG. 5 following rupture of the same, as just described.

Figure 6:
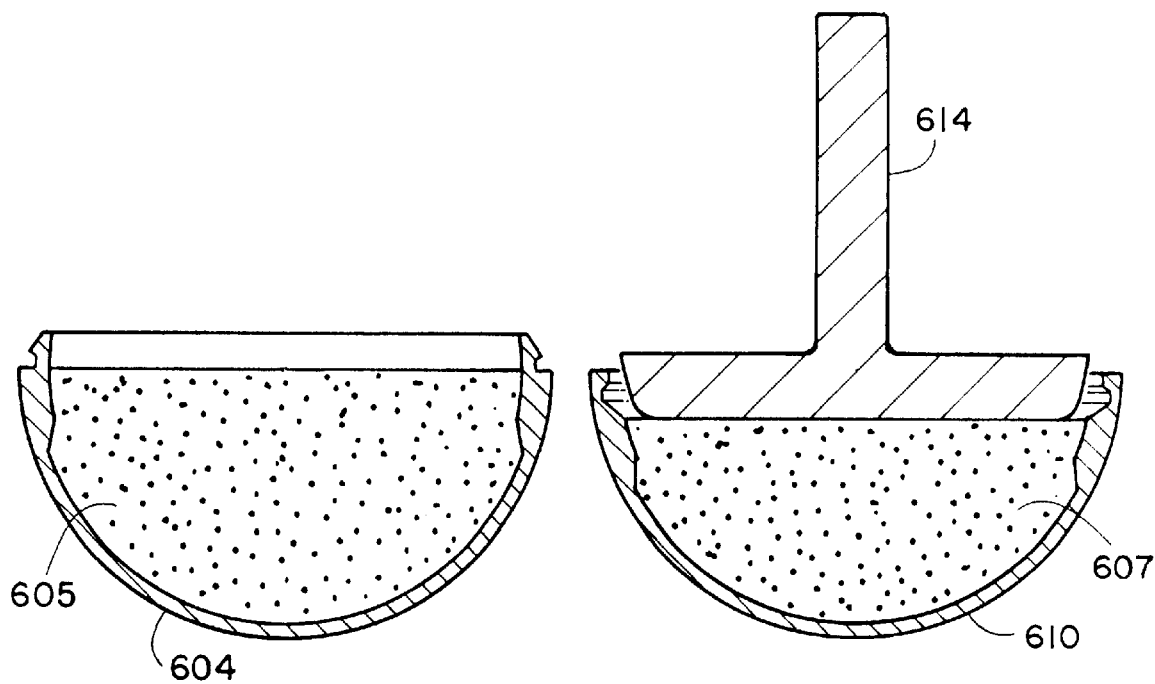
FIG. 6 is a cross-sectional view of two capsule halves, in accordance with preferred projectile systems herein, during assembly of the capsule, illustrating use of a mandrel to compress the substance within the capsule half, thereby preventing spillage during assembly of the capsule.

In an alternative preferred assembly method, illustrated in FIG. 6, a mandrel, 614 or other similar tool, may be employed to mechanically compress or tamp the powdered substance 607 within each half capsule 604,610 to retain the substance therein during the remainder of the assembly process. In FIG. 6, one half of the capsule 604 is shown as having had its contents compressed, while the second half 610 is shown with the mandrel 614 therein. It will be appreciated by those of skill in the art that the mandrel or other similar tool may be, and preferably is, a part of a machine (not illustrated) used to mechanically assemble the capsules in accordance herewith.

Figure 7:
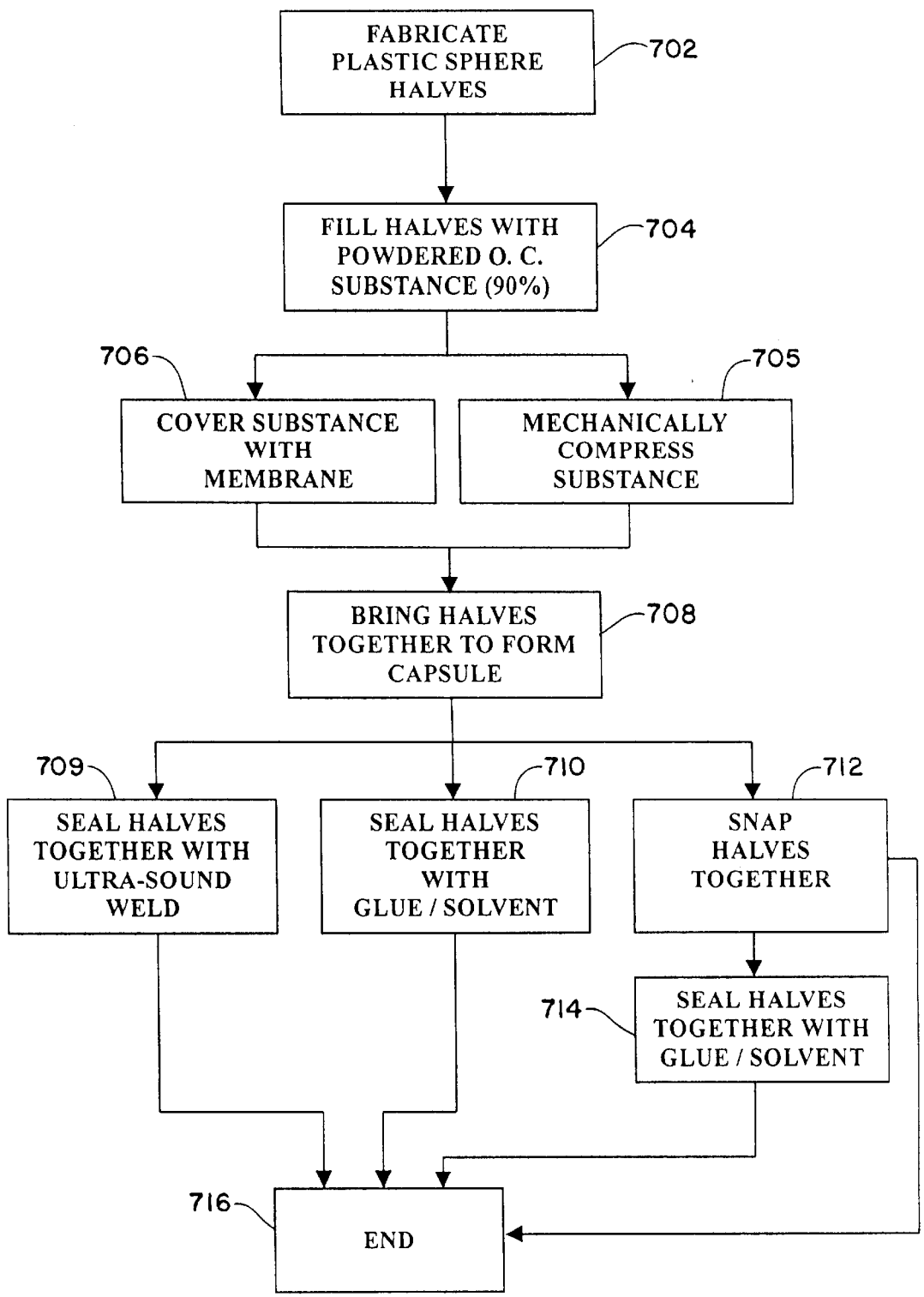
FIG. 7 is a flow chart showing alternative, preferred methods of assembly of a projectile system in accordance herewith.

Referring now to FIG. 7, a flow chart is shown illustrating in detail preferred methods of assembly of a projectile system 600, in accordance herewith, wherein the projectile system 600 comprises a capsule 613 formed from two about equal halves 604, 610, the structures of which are described above, which capsule 613 contains a powdered substance, especially a powdered inhibiting substance and most preferably a powdered oleoresin capsicum composition. The method illustrated includes some of the preferred alternatives for assembly.

Thus, in a preferred method, each half 604, 610 (FIGS. 2, 3 & 6) is fabricated using suitable molding or forming techniques (Block 702), and each is filled (Block 704) to about 90% of its volume with the substance 605, 607, respectively, to be delivered to the target, especially a powdered substance, and most preferably an oleoresin capsicum composition. In one alternative, a thin membrane 602, 608 is then placed (Block 706) into each half of the capsule 604, 610 to cover the substance 605, 607 contained therein. In a second alternative a mandrel 614, or other tool, is used to mechanically compress the substance within each half (Block 705). At this point in the method, the halves 604, 610 are substantially as shown in FIGS. 2 and 6, with and without membranes, respectively.

In practice, the two halves 604, 610, after having been covered by the membranes 602, 608 or mechanically compressed, are then preferably rotated about 90°, towards one another and brought together (Block 708). The halves 604, 610 are then preferably sealed to one another (Blocks 709, 710, 712, 714), such as using ultrasonic welding techniques (Block 709), or using an appropriate solvent or glue (Block 710) or by snapping the halves together (Block 712). For example, if polystyrene is used, many known solvents are available that will dissolve the polystyrene just enough to result in sealing of the same as the plastic hardens upon evaporation of the solvent. Polystyrene is commonly used for plastic models, and thus, various modeling glues are available that provide suitable sealing.

Figure 8:
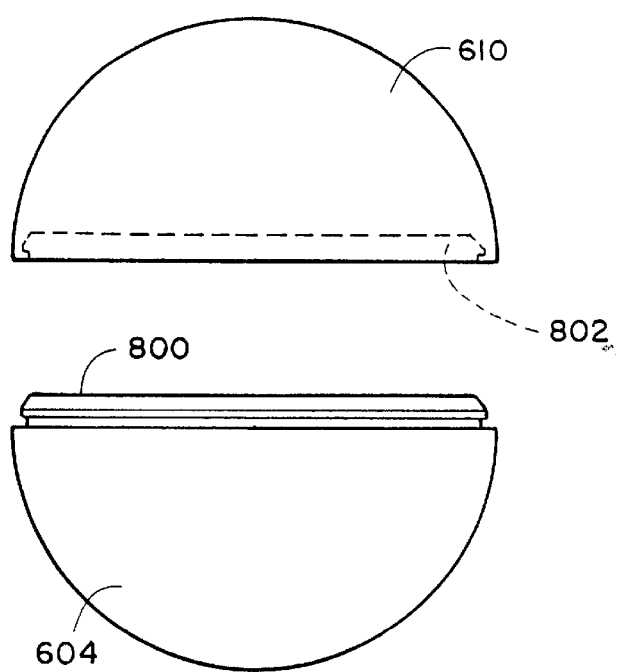
FIG. 8 is a side-view of a capsule in accordance with the projectile systems herein, illustrating a preferred snap-together structure employing mated flanges.

With respect to the alternative of sealing of the halves by snapping them together, FIG. 8 illustrates capsule halves 604, 610 that have been formed with interlocking flanges 800, 802 thereon such that the two halves may be mated and so snapped together (Block 712). Subsequent to mating the capsule halves and optionally, the capsule may be sealed (Block 714), such as by addition of a solvent, along the seam, which solvent essentially melts the plastic of the halves into one another as described above. In a most preferred embodiment herein, the flanges are formed with grooves 802 and tongues 800 such that the two halves (female and male, respectively) interlock when snapped together, providing at least a nearly hermetic seal to the capsule. (See, for example, FIGS. 8 and 12–16.)

Referring then to FIG. 8, two capsule halves 604, 610 are shown with the above-mentioned interlocking flanges 800, 802. As can be seen, the flanges 800, 802 are slightly flared, so as to be slightly frustoconical in shape. Slight deformation of the respective flanges 800, 802 during assembly, and reformation as these flanges 800, 802 snap together, places these frustoconical shapes against one another, and thus holds the halves 604, 610 tightly in place against one another. As mentioned above, a droplet of solvent can be placed at the seam of the halves 604, 610, once the halves 604, 610 are assembled, thereby providing not only mechanical assembly of the halves but also insuring hermetic sealing thereof, which may be important in environments where, for example, water vapor may contaminate the substance contained in the capsule. Alternatively, the membranes 602, 608 (FIG. 2), previously described, may serve as a first and last line of defense against contaminants to the substance 605, 607, where the membranes are maintained intact following assembly rather than being forcibly ruptured prior to use thereof. Further still, the flanges 800, 802 of the capsule halves 604, 610 may be designed to alone provide at least a near hermetic seal. Referring back to FIGS. 4 and 5, once the halves 604, 610 are assembled into a spherical capsule 600 and, optionally, sealed, the projectile system 600 is complete (Block 716).

In embodiments employing membranes, the membranes 602, 608 are selected to be strong enough to retain the substance 605, 607 within the halves 604, 610, as the two halves are joined, yet thin enough to readily rupture on or before impact of the projectile system 600 with the target. Most preferable, in this regard, are thin, circular cut, paper membranes that will tension against respective inner walls of the halves 604, 610 sufficiently to retain the substances 605, 607 therein. For example, the membrane may tension within an interior scoring of the capsule half (see, e.g. FIGS. 14–16, discussed further herein), where such is provided. In those embodiments employing membranes, the membranes 602, 608 are preferably gently air-cleaned along the circular contact surface after placement within the halves 604, 610 and prior to rotation of the halves 604, 610 to bring them together for welding, snapping and/or other sealing.

It will be appreciated by those of skill in the art that the membranes useful in these embodiments may be formed of any number of materials, including for example, paper, plastic or other polymer, rubber or even foam sponge. Generally, the membranes will be circular cut to be slightly larger than the interior circumference of the capsule half at the point where it is to contact that interior surface. Thus, when placed into the capsule half and, preferably, compressed, the membrane will tension against the interior surface of the capsule and thereby retain the substance therein. The membranes are preferably from between about 1 to about 5 mm thick, most preferably about 3 mm; however, other thickness are likewise contemplated herein, especially depending upon the specific substance contained within the capsule. For example, where both a liquid and a powdered substance are to be included in the capsule, it may be advantageous to provide a slightly thicker membrane to insure separation of the two substances until rupture of the capsule on or about the target.

As previously described, the spherical capsule of the present invention preferably has an outer diameter of about 1.8 cm and an inner diameter of about 1.7 cm. While these capsule dimensions are preferred for use in the present embodiments, other dimensions are likewise possible. For example, U.S. Pat. No. 5,254,379, issued to Kotsiopoulos, et al. on Oct. 19, 1993, the contents of which have previously been incorporated herein by reference, describes a paint ball having dimensions different from those preferred herein, but which may, none-the-less, be useful in combination with the teachings herein.

While a spherical capsule 600 is illustrated, it will be readily appreciated by those of skill in the art that the capsule, or shell, may be of any convenient shape. What is of particular importance is that the capsule be optimally filled to, for example, at least greater than 50%, preferably about 60% to less than 100%, more preferably about 85% to 95%, e.g., about 90%, of its total volume with the substance 611. It is at these optimal fill levels that optimum dispersal of the substance is achieved and, therefore, that the effectiveness of the projectile system, whether to mark an individual target for later identification or to impair a target by, for example, irritating skin, mucous membranes, vision and/or lungs, is maximized.

Referring next to FIGS. 9–17, various preferred embodiments of the projectile systems 600 described herein are illustrated wherein the capsule includes structurally weakening features or fracture points on the exterior (22, 32, 46) or interior (47) surface thereof, which fracture points primarily facilitate rupture of the capsule upon impact with a target. In particular, for example, the exterior or interior surface of the capsule is optionally provided with scorings (FIGS. 12–16) or with indentations/dimples (FIGS. 9–11) or with both (FIG. 17), thereby providing structural weak points within the capsule along which weak points the capsule may readily fracture.

Figure 9:
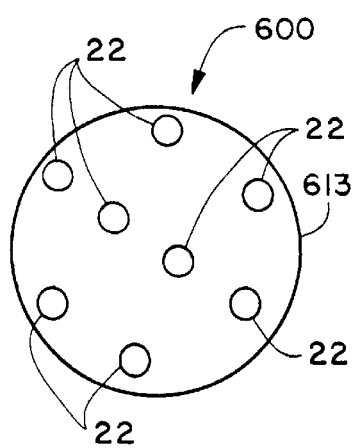
FIG. 9 is a side view of a projectile made in accordance with one variation of the projectile of FIG. 1 modified to include a pattern of exterior dimples that serves the tripartite purposes of decreasing drag, increasing lift, and facilitating atomization of the inhibiting substance upon impact with the living target.
Figure 10:
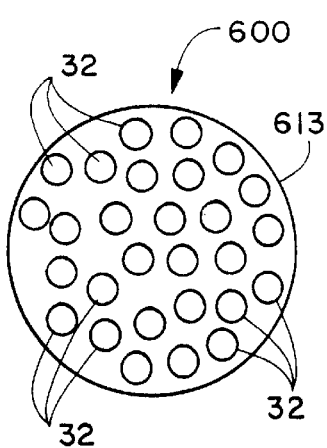
FIG. 10 is a side view of a projectile made in accordance with another variation of the projectile of FIG. 1 modified to include another pattern of exterior dimples that serves the tripartite purposes of decreasing drag, increasing lift, and facilitating atomization of the inhibiting substance upon impact with the living target.

Referring to FIG. 9, a side view is shown of a projectile system 600 made in accordance with one variation of the projectile system 10 (FIG. 1), described above, that has been modified to include a pattern of exterior dimples 22 in the capsule 613 that serve the tripartite purposes of facilitating fracture of the capsule 24 and atomization of the substance contained therein, upon impact with the living target and of improving flight of the projectile system 600 by decreasing drag and increasing lift thereof.

The capsule 613 of the projectile system 600 of FIG. 9 is similar in materials, dimensions and manufacture to the capsule 12 of the projectile system 10 shown in FIG. 1, but employs the pattern of exterior dimples 22 so as to facilitate rupture of the capsule 613 upon impact with a target and to provide lower drag and greater lift to the projectile system 600 during flight, thus potentially making possible longer distances of flight. Importantly, the dimples 22 provide structural weak points at which the capsule 613 can burst upon impact with the target, thereby improving atomization of the inhibiting substance contained within the shell 613. This, in combination with the optimized fill specifications described herein, results in a larger and finer cloud of inhibiting/impairing substance being dispersed proximate to the target immediately following impact of the projectile system 600 with the target. The larger and finer cloud of inhibiting substance provides for more effective inhibition of the target than has heretofore been possible with conventional non-lethal or less-than-lethal projectiles.

The dimples 22 are most preferably round at their exterior edge, have a frustioconical-shaped wall and a flat, circular innermost surface, or basal portion. The dimples 22 preferably have a depth of at least about 0.05 mm preferably between about 0.05 mm and 2.0 mm, e.g., between about 0.1 mm and 1.5 mm, e.g., between about 0.2 mm and 1.0 mm, e.g., about 0.3 mm and preferably have a minimum depth of about 15% to 75%, e.g. 20% to 40% of the thickness of the casing or shell. Preferably, there are from between six and 50 dimples 22, e.g., 20 dimples, on the shell/capsule 613 so as to provide omnidirectional atomization of the inhibiting substance upon impact and a maximal decrease in drag and increase in lift.

The dimples 22 may be formed in the capsule 613 using known methods, for example, as a part of the injection molding process, using laser ablation techniques, or using other known plastics forming techniques.

Referring next to FIG. 10, a side view is shown of a projectile system 600 made in accordance with another variation of the present invention, modified to include a different pattern of exterior dimples 32 in the shell 613 which dimples continue to serve the tripartite purposes of facilitating rupture of the capsule and atomization of the inhibiting substance, upon impact with the living target, and of decreasing drag and increasing lift of the projectile system during flight thereof.

As can be seen, there are a greater number of exterior dimples 32 in the variation of FIG. 10, which may further improve rupture and atomization and further decrease drag and increase lift. Preferably, the dimples 34 are arranged in a pattern in the exterior surface of the casing 613 so that each of six equal sectors of the casing show at least one dimple 32 thereon. Other dimple arrangements, such as are known in the golfing arts, may also be suitable. See, e.g., U.S. Pat. No. 4,560,168, issued to Aoyama, for a GOLF BALL, incorporated herein by reference in its entirety.

Figure 11:
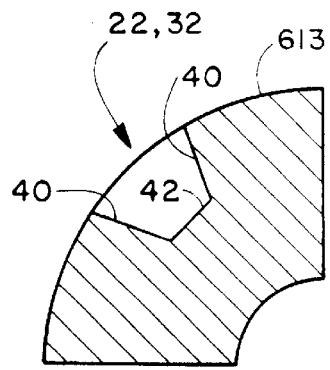
FIG. 11 is a partial cross-sectional view illustrating an example of an exterior dimples of the variations of the projectile shown in FIG's 2 and 3.

Referring next to FIG. 11, a cross-sectional view is shown of an example of a preferred structure for the exterior dimples 22, 32 of the above-described capsules 613. As can be seen, the dimples 22, 32 have frustioconical-shaped interior walls 40 and a flat innermost surface 42, or basal portion, with a depth of at least about 0.05 mm, preferably between about 0.05 mm and 2.0 mm, e.g., between about 0.1 mm and 1.5 mm, e.g., between about 0.2 mm and 1.0 mm, e.g., about 0.3 mm and preferably have a minimum depth of about 15% to 75%, e.g. 20% to 40% of the thickness of the casing or shell. As mentioned above, the dimples 22, 32 can be produced using laser ablation techniques, by forming them into the shell using injection molding techniques or using other known forming techniques.

Figure 12:
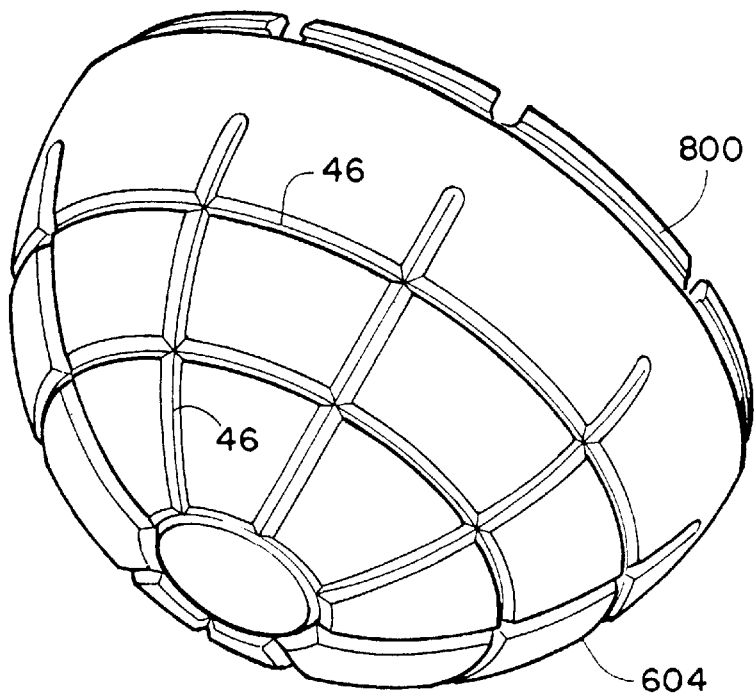
FIG. 12 is a perspective view of one half of a capsule of the present projectile system made in accordance with a further variation of the projectile system of FIG. 1 modified to include a matrix pattern of exterior global scoring and also showing the male flange of a preferred snap-together embodiment of the capsule.
Figure 13:
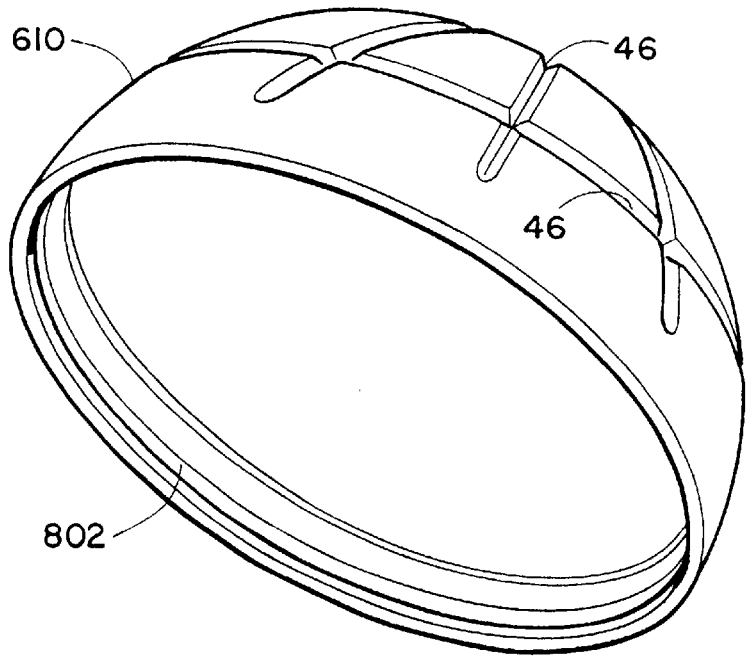
FIG. 13 is a perspective view of the complimentary, female, half of the capsule illustrated in FIG. 12, also illustrating the matrix pattern of exterior global scoring and further showing an example of a female flange of the preferred snap-together embodiment of the capsule.
Figure 14:
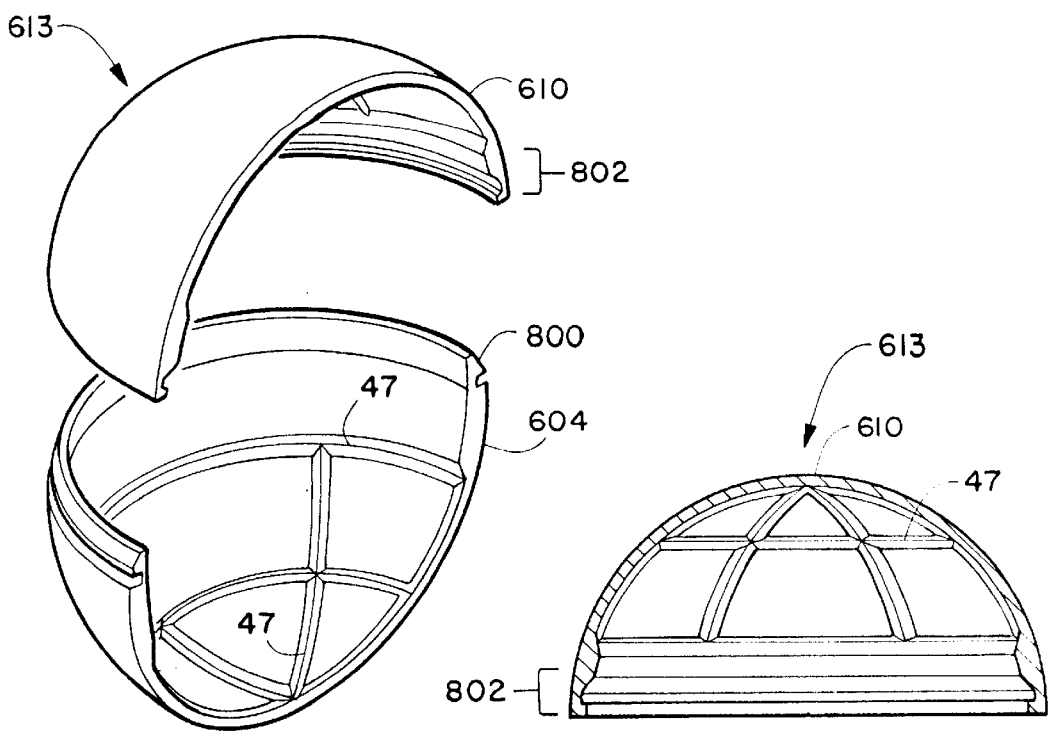
FIG. 14 is a cross-sectional perspective view of an alternative capsule in accordance with the projectile systems herein, wherein the capsule halves are not joined and illustrating interior scoring of the capsule.
Figure 15:
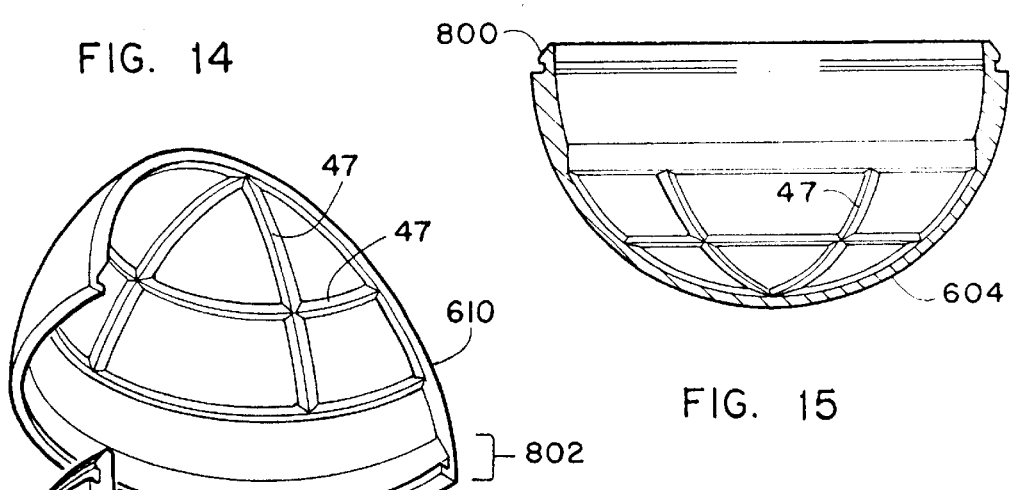
FIG. 15 is a cross-sectional side view of the capsule of FIG. 14.
Figure 16:
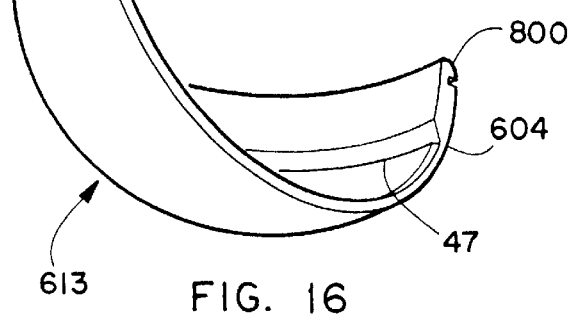
FIG. 16 is an additional cross-sectional perspective view of the capsule of FIGS. 14 and 15.

FIGS. 12 & 13 are prospective views of two complimentary halves of a capsule 604, 610 made in accordance with a still further variation of the system of FIG. 1. In this embodiment, the capsule 604 and 610 together is modified to include a matrix pattern of exterior global scoring 46 that serve the tripartite purposes of facilitating rupture of the capsule and atomization of the inhibiting substance, upon impact with the living target, and of decreasing drag and increasing lift during flight of the projectile system.

The capsule halves 604, 610 of FIGS. 12 & 13 are similar in materials, dimensions and manufacture to those previously described, but employ the matrix pattern of exterior global scoring 46 as an added feature. The scoring provides a lattice of structural weak points at which the casing can burst upon impact with the target. As with the embodiment shown in FIG. 9, this results in a larger and finer cloud of inhibiting substance being dispersed proximate to the target, immediately following impact of the projectile system with the target. Such dispersal provides for more effective inhibiting of the target than has heretofore been possible with conventional projectile approaches. The scoring 46 is preferably "V"-shaped in cross-section with an angled or slightly flat bottom portion of the "V" providing a basal portion of such scoring. The scoring preferably has a depth of from between about 0.1 mm and 1.5 mm, e.g., between about 0.2 mm and 1.0 mm, e.g., about 0.6 mm and preferably has a minimum depth of about 15% to 75%, e.g. 20% to 40% of the thickness of the casing or shell 604,610. Preferably, there are from between about 2 and 10, e.g., between 4 and 7, circumferential (i.e., latitudinal) scores and from between about 2 and 10, e.g., between 6 and 8 longitudinal scores in the surface of the shell 604,610 so as to provide omnidirectional atomization of the inhibiting substance upon impact and a maximal decrease in drag and increase in lift for the projectile.

FIGS. 14–16 are cut-away perspective and side views of yet another alternative embodiment of the capsules 613 of the present projectile systems. In these embodiments, interior surface scoring 47 is used to facilitate rupture of the capsule 613 and atomization of the substance contained therein (not illustrated), upon impact of the projectile system with a living target. The structure and dimensions of the capsule 613 is as previously described. Similarly, the structure and dimensions of the interior scoring is the same as just described for the exterior scoring. Thus, neither is again presented here. The interior scoring 47 is preferably formed into the capsule halves 604, 610 during manufacture thereof, for example during molding of the capsule halves. Alternatively, the interior scoring 47 may be added to the capsule halves 604, 610 after manufacture and before filling of the halves, such as by laser ablation.

FIG. 17 is a side-view of a projectile system 600 made in accordance with a still further variation of the system of FIG. 1. In this embodiment, the capsule 613 is modified to include both a matrix pattern of exterior global scoring 46 and a pattern of dimples 32, which dimples are, preferably, interconnected by the matrix pattern of scoring. This combination of dimples and scoring serves tripartite purposes of facilitating rupture of the capsule and atomization of the substance contained therein, upon impact with the living target and of decreasing drag and increasing lift during flight of the projectile system. As the exterior structurally weakening features of dimples and scoring are substantially as described above with reference to FIGS. 9 through 13, further description of the structure, shape and dimensions of the dimples and scoring in FIG. 17 is not made herein.

The scoring and the dimples, illustrated in FIG. 17, provide a lattice of structural weak points interconnecting structurally weakening dimples, at all of which the casing 613 can burst upon impact with the target. As with the above embodiments, this results in a larger and finer cloud of inhibiting substance being dispersed proximate to the target, immediately following impact of the projectile system 600 with the target. Such dispersal provides for more effective inhibiting of the target than has heretofore been possible with conventional projectile approaches.

Referring next to FIG. 18, a cross sectional view is shown of a further variation of the projectile systems described herein. The projectile system 900 is similar in structure and contents to the projectile systems of FIGS. 2–4, except that solid material 902 has been added to the substance 605, 607 e.g., a powdered inhibiting substance, within the capsule 900. As can be seen, the halves 604, 610, the membranes 602, 608 and the inhibiting substance 605, 607 are shown, and are substantially the same as described above with reference to FIGS. 2–4. Assembly is substantially as illustrated in FIGS. 2–6 and as described in FIG. 7, but with the addition of the solid material to the substance within the capsule 900. The solid material 902 may be, for example, crushed walnut shells, rice, metal particles, such as metal powder or filings, wood particles, such as wood shavings or wood dust, or any other readily available solid that can be added to the substance 605. Facts such as cost, density, and toxicity factor into selection of the solid material 902.

Advantageously, the solid material 902 helps to disperse the substance 605, 607 by carrying the substance 605, 607 quickly away from the point of impact in a generally radial (or lateral) direction. Further discussion of the radial dispersion of the substance 605, 607 is made herein below, both with respect to projectiles carrying a solid material 902, and projectiles not carrying solid material.

Referring next to FIG. 19, a projectile system is shown 1000 in accordance with a further variation of the embodiments described herein. Shown are the halves 604, 610, the membranes 602, 608, and the substance 605, 607 therein. Also shown are metal filings 1002, such as iron, steel, or bismuth filings, added to and intermixed with the substance. Alternatively, any of the previously mentioned solid substances, including for example metal powders, such as powdered iron, steel or bismuth, may be used in lieu of the metal filings. The metal filings 1002 function in a manner similar to the manner in which the solid material 902 (FIG. 18) functions in that, upon impact, the metal filings, being more dense than the substance 605, 607 are flung radially, thereby breaking up the substance, atomizing the substance and carrying the substance radially, perhaps further than the substance would be dispersed absent the metal filings 1002. In addition, the metal filings increase the mass of the projectile, thereby increasing the kinetic force applied by the projectile against the target upon impact of the projectile against the target. As a result, the variation shown may offer as an advantage, not only enhanced inhibiting of a target, due to a more widely dispersed cloud of inhibiting substance, but also enhanced kinetic "thumping" against the target, thereby increasing the initial stunning blow delivered by the projectile. This increase in kinetic force may also enhance the ability of the projectile to leave a bruise on the target, thereby enhancing the projectile's ability to serve not only as a tool for inhibiting a target, but also as an evidentiary tool, should doubt arise as to whether a certain individual is one that has been hit by a projectile of the embodiments specified herein.

The projectile systems may be arranged such that successively fired projectiles or groups of projectiles are of relatively greater mass than previous projectiles or groups of projectiles, thereby gradually increasing the kinetic force of "thump" experienced by a target, assuring that both adequate kinetic force is used to achieve stunning of the target, while at the same time assuring that a minimum amount of kinetic force is applied to any given target. For example, a child or female target is much more likely to be affected by earlier, lower kinetic forces or "thumps" than will be a large male. This, combined with the possible inclusion of a powdered inhibiting substance of a prescribed concentration or of an increasing concentration, provides law enforcement and military personnel with a non-lethal approach suitable for delivering a minimumly necessary amount of non-lethal or less-than-lethal technology to a target of virtually any size, shape or tolerance level.

Referring next to FIG. 20, a projectile system is shown 2000 in accordance with a further additional variation of the embodiments described herein. Shown are the halves 604, 610, the membranes 602, 608, and the substance 605, 607, therein. Also shown are metal shot 2002, such as iron or steel shot or, alternatively, metal, wood or ceramic balls which are added to and intermixed with the substance 605, 607. The metal shot 2002 function in a manner similar to the manner in which the metal filings 1002 (FIG. 19) function, and thus, to that extent, further explanation of their functionality is not made herein. The metal shot 2002 have the added benefit that they may, in some circumstances, also provide an additional source of discomfort for the target, as the metal shot 2002 impact against the target after the projectile explodes.

Referring next to FIG. 21, a projectile system is shown 3000 in accordance with a further additional variation of the embodiments described herein. Shown are the halves 604, 610, the membranes 602, 608, and the substance 605, 607 contained therein. Also shown are relatively large, metal balls 3002, such as iron or steel balls, (or alternatively ceramic, plastic or glass balls), added to each half of the capsule 604, 610 and generally surrounded by the substance 605, 607. The metal balls 3002 function in a manner similar to the manner in which the metal shot 2002 (FIG. 20) function, and thus, to that extent, further explanation of their functionality is not made herein. The metal balls 3002, however, also have the added benefit that they may, in some circumstances, provide an additional source of discomfort for the target, as the metal balls 3002 impact against the target after the projectile explodes.

Referring next to FIG. 22, a cross sectional view is shown of yet another variation of the embodiments described herein. Shown are the halves 604, 610, the membranes 602, 604 and the substance 605, 607. In this variation, one of the halves 604 is filled with the powdered substance 605, as described above, while the other half 610 is, for example, filled with a liquid or gas substance 4002, which substance may be an irritant, a marking agent or may serve as additional weight to the projectile system 4000. In this variation, the benefits of an additional irritant (i.e., in addition to the powdered substance 605) lie in the particular application to which the teachings herein are put. With respect to marking, the evidentiary benefits will be apparent to the skilled artisan, and lie primarily in situations when a target temporarily eludes law enforcement officers. In this situation, it is important for law enforcement to be able to identify a target as having been the same target that was hit by a projectile fired by law enforcement personnel, e.g., as the target is escaping from a crime scene. Where the second substance 4002 is added to increase the mass of the projectile, then the benefit of increased kinetic force upon impact of the projectile against the target, and thus an increased ability to initially stun a target is realized.

It will be appreciated by those of skill in the art that numerous variations of these alternative embodiments are possible, and thus, are equally contemplated hereby. For example, in one alternative, one half of the capsule may be filled to about 90% or more of its volume with a powdered inhibiting substance and covered with a membrane as previously described. The other half of the capsule may then have, for example, a liquid marking/tagging substance placed therein, occupying about 60% or less of the total volume of the second half. A membrane may then be placed over the liquid substance and additional powdered substance placed on top of the membrane. Preferably the powdered substance added to the second half of the capsule containing the liquid marking substance will be in an amount equal to about 30% or more of the volume of the half capsule. The half capsule containing only powdered substance is then placed atop the second half capsule (containing the liquid and powder) and the two halves are joined, and, preferably sealed. Thus, the completely assembled capsule, according to the present alternative, will contain liquid marking substance at a volume of about 30% or less of the total volume of the capsule and will contain powdered substance at a volume of about 60% or more of the total volume of the capsule. Other combinations, including those employing more than two membranes, will be readily appreciated by those of skill in the art. Of course, those embodiments wherein the capsule contains both a liquid substance and a powder substance will preferably include membranes that rupture only upon impact, such that the liquid and powder are kept separate until deployed.

Advantageously, the projectile systems contemplated herein are muzzle safe, that is they may be safely and effectively fired at close range, including, for example, at arm's length. In contrast, other long range non-lethal projectiles have not proven to be safe immediately outside a muzzle. A further important feature of the present projectile systems is that they are not only easy to manufacture in large quantities, but they are also very inexpensive compared with prior art projectiles.

Thus, having specified numerous variations and embodiments of the projectile, and methods of manufacture, FIGS.

23 through 31 show various applications and tactics for using the projectile embodiments. Such figures are described hereinbelow.

Figure 23:
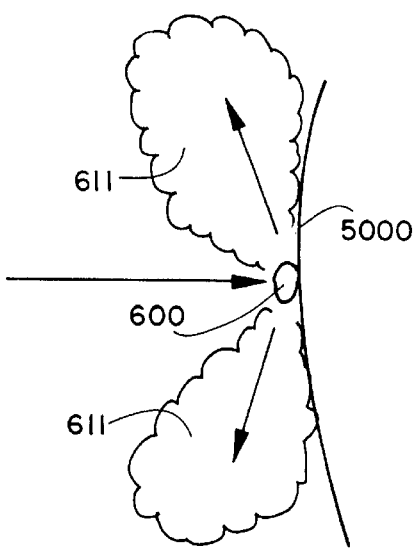
FIG. 23 is a side view of a projectile system, such as are illustrated in FIGS. 4, 5, 9, 10 & 17, as it impacts a target.
Figure 24:
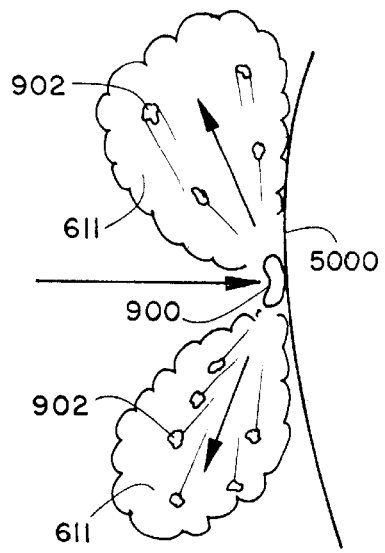
FIG. 24 is a side view of a projectile system, such as are illustrated in FIG. 18, as it impacts a target.

Referring to FIGS. 23 and 24, side views are shown of the projectile systems described and illustrated in FIGS. 4, 5, 9, 10 & 17 and the projectile system of FIG. 18, respectively, as they impact against a target 5000. As can be seen, for example, in FIG. 23, the optimal fill, described above, results in a wide dispersion of the substance, substantially radially away from the point of impact and away from an axis defined by the projectile's trajectory as it impacts the target. Similarly, FIG. 24 illustrates the solid material 902 being projected radially with the substance 611, thereby driving the substance 611 more radially away from the projectile, and enhancing its dispersion pattern. (It is noted that the substance 611 is the same as 605, 607 in those figures illustrating capsule halves. See for example, FIG. 5.)

The embodiments of the projectile systems described herein are particularly advantageous in that their use may be readily incorporated into existing officer training programs. This is because the projectiles are designed to be fired at a target's upper torso (See e.g., FIG. 25), which is the same area officers are trained to aim at when using lethal weapons.

When officers are confronted with a situation in which they must use force, whether or not that force must be lethal, they are, of course, stressed. Having to take additional time to decide where to aim a weapon depending upon the projectiles contained therein can actually be dangerous for the officer. By providing a non-lethal projectile system that may be aimed in the same manner and at the same point on a target as are other, lethal, projectiles, an officer is more likely to be able to react quickly and accurately in firing such projectiles.

Referring to FIGS. 25 through 27, a sequence of profile views are shown of a target 5000, as he or she is impacted with a projectile system 600 of the present invention. In FIG. 25, the target 5000 is first impacted with a projectile system 600 of the present invention. The target's head 5002, at the time of impact, is illustrated as in a generally upright forward-looking position. Nearly immediately upon impact, the capsule of the projectile system ruptures, dispersing its contents 5004 in a radial, cloud-like manner on and about the target 5000. About simultaneously with dispersal of the contents 5004 of the capsule, the target 5000 begins to hunch towards the point of impact of the capsule on his/her body. (See FIG. 26) Thus, the target's back side moves in a generally posterior (rearward) direction, while his/her head and upper chest region move in a generally anterior (forward) and inferior (down) direction so as to hunch around the point of impact. Quite advantageously for the purposes of the present invention, such movement is a natural reaction for people when they are hit by something with such force. Within a matter of seconds, and as illustrated in FIG. 27, the target's head 5002 is essentially surrounded by the dispersing cloud of inhibiting and/or marking substance 5004. Where an inhibiting substance is employed, the target 5000 will feel pain as the inhibiting substance contacts his/her mucous membranes (i.e., his/her eyes, nose, mouth and throat), and as the target inhales the substance (also a natural reaction), he/she will experience significant pain in his/her lungs, will temporarily be unable to breathe and will begin to panic. Under such circumstances, even the most aggressive target is easily subdued and apprehended. Thus, the target's movements, in response to impact of the projectile, combined with the radial dispersement of the substance on and about the target, provides a particularly effective non-lethal inhibition of the target.

This present embodiment, then, provides a method of slowing and/or stopping and/or marking a living target. According to this method, the projectile system is fired at a target; the mechanical force of the impact causes rupture of the capsule, thereby permitting dispersal of the capsule contents, additionally, the force is sufficient to cause the target to move towards the dispersing substance, resulting in inhalation of the same, as the target attempts to catch his/her breath following the impact. As the substance is inhaled and/or contacts the mucous membranes in the face region, the target is stunned, that is physically impaired, and thus, collapses.

Further contemplated herein, is providing a projectile system wherein the projectile, especially a generally spherical capsule, is sufficiently hard and is delivered with sufficient force to result in bruising of the target at and surrounding the point of impact. In this way, the target is not only exposed to an inhibiting substance, but is also temporarily marked for later identification. For example, if any confusion arises as to who has been hit by the non-lethal projectiles, such as where the target is able to recover from or escape the effects of the inhibiting substance before officers are able to apprehend him/her, then the target may later be identified by the bruising, should he/she ultimately be apprehended. Those of skill in the art, will readily appreciate that the force required to fire a projectile system in accordance herewith, at a target, such that the projectile ruptures upon impact with the target, will generally also be sufficient to cause bruising to the target. It will further be appreciated by those of skill in the art that the capsules of the present invention may alone be used to mark a target, by bruising of the same, with or without delivery of any substances.

Figure 28:
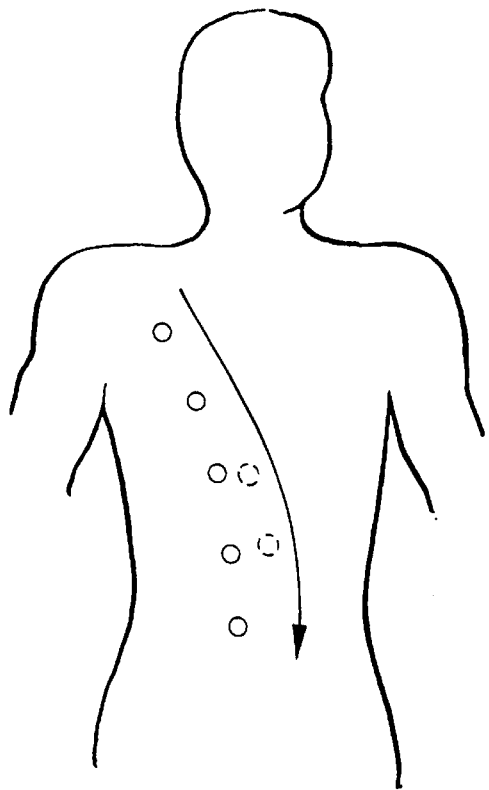
FIG. 28 is a frontal view of a human target with a preferred firing pattern, for the projectile systems herein, illustrated on his/her body.
Figure 29:
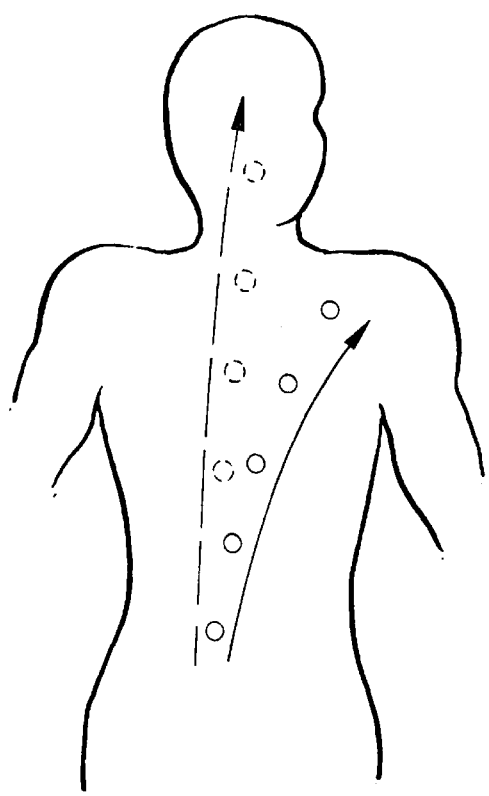
FIG. 29 is a frontal view of a human target with two alternatively preferred firing patterns, for the projectile systems herein, illustrated on his/her body.

Referring next to FIGS. 28 and 29, front views are shown of various firing patterns that may be used when firing the projectiles of the present invention, which firing patterns offer particular advantages when used in combination with the projectile systems described herein and with rapid firing techniques.

Quite advantageously, the projectile system of the present invention may be rapid fired, for example using a compressed air pistol, compressed air rifle, a fully automatic launcher, a dual-use modified PR24 police baton, and/or a dual-use modified flashlight.

A rapid fire weapon can be rapid fired in a vertical direction, such as illustrated in FIG. 28, from the top (superior region) of the target's torso, for example, near his/her shoulder, down to the bottom (inferior region) of the torso and body, for example, near his/her groin. It has been discovered, by the inventors, that this firing method exploits the targets tendency to retract a stricken portion of their body, and to follow (i.e., hunch around) a pattern of impacts, thereby resulting in the target moving his/her body ever more downward and into the dispersing substance, resulting in maximum incapacitation of the target. In this instance, the target moves in a manner similar to that shown in FIGS. 25 through 27, however, the movement of the target's head into the cloud is even more dramatic when the illustrated rapid firing method is employed. (FIG. 28)

Note that while the rapid firing method has been discovered to offer particular advantages, traditional wisdom dictates a horizontal sweeping of the target's body with projectile impacts. The inventors are aware of no heretofore employed methods that specify vertical sweeping of a target's body with non-lethal or less-than-lethal projectiles.

Referring next to FIG. 29, a front view of a target, similar to that of FIG. 28, is shown. In this variation, however, the patten of projectile impacts move from the lower (inferior region) of the target's torso/body up to the top (superior region) of the torso/body, e.g., from the target's groin area towards either the target's shoulder or head, with the "head pattern" being shown in dashed lines.

The variation illustrated in FIG. 29 is particularly advantageous in highly volatile, highly dangerous situations, such as when confronting targets under the influence of powerful drugs. While normally use of non-lethal projectiles would dictate that a target's head be avoided as a target area, this firing pattern provides a user with an option to move the projectile impact pattern to the target's head in the even that all other efforts fail to subdue the target. If, on the other hand, the target is subdued, the firing pattern can move safely to the target's shoulder. The inventors contemplate that this pattern of projectile impacts will be slightly less effective in getting a target to move his or her head into the cloud of substance; however, it does offer the advantage of providing a severe option, when, for example, deadly force would be justified.

Figure 30:
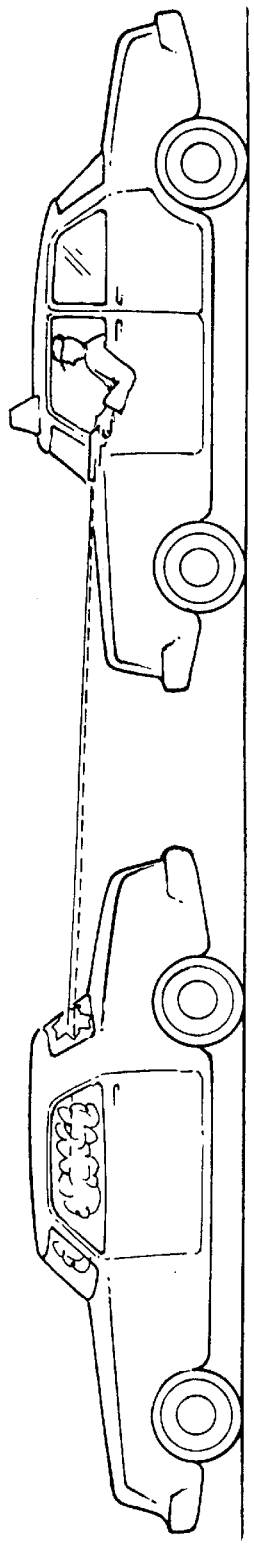
FIG. 30 is a side view of a tactic, contemplated herein, for stopping a car under chase using the projectile systems described herein.

Referring next to FIG. 30, a side view is shown of a tactic for stopping a car under chase. Contemplated herein is loading a weapon with both impairing capsules and kinetic capsules, that is, respectively, frangible capsules containing an inhibiting and/or marking substance and frangible capsules that are hollow or that contain an inert substance. Alternatively, breaker balls, e.g., stainless steel, ceramic, plastic or glass balls, contained in a frangible capsule in accordance herewith, may be substituted for kinetic capsules.

Thus, for example, as the weapon is rapid fired at a suspected criminal who is within a vehicle, the first rounds of capsules would be kinetic capsules or breaker balls that simply break the windows (solid line shows trajectory) of the vehicle to facilitate entry of the subsequent, impairing capsules that would then fill the vehicle (dashed line shown trajectory), at least in the vicinity of the criminal, with the inhibiting substance, thereby rendering the target unable to operate his or her vehicle.

Figure 31:
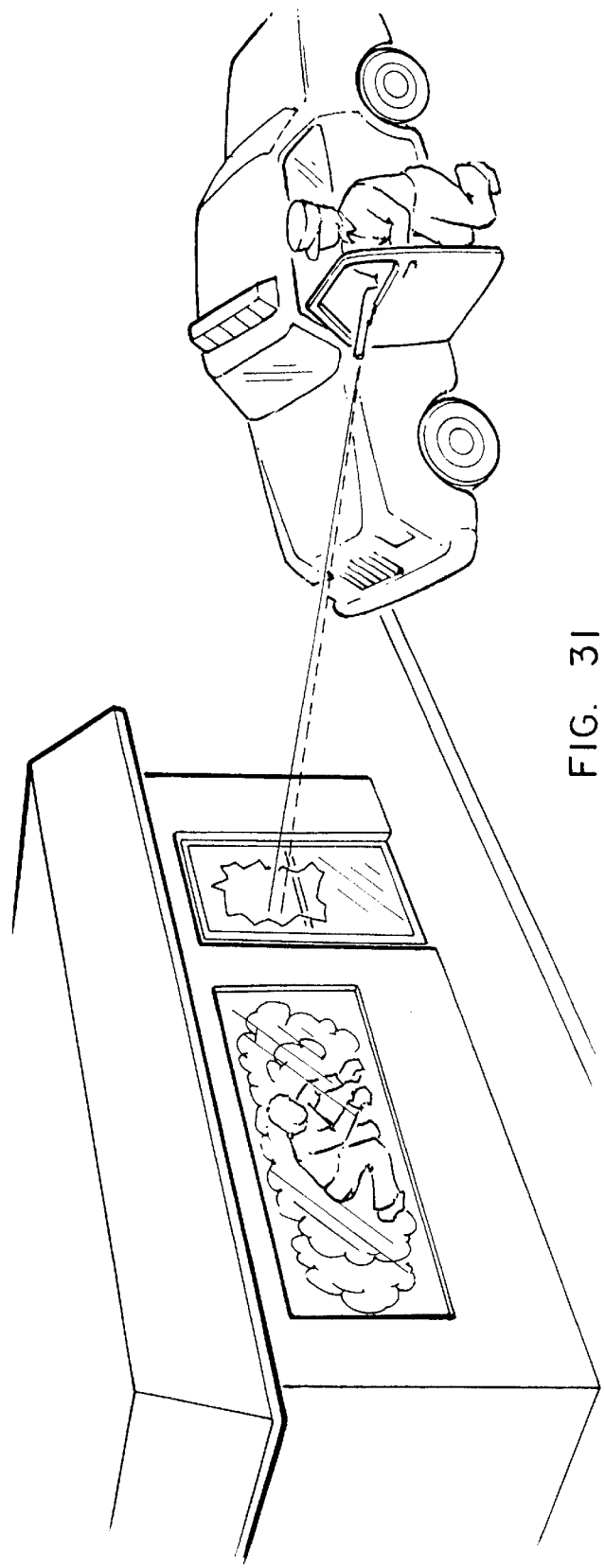
FIG. 31 is a perspective view of a further tactic contemplated herein, for delivering projectile systems in accordance herewith, to a target within a building.

Referring next to FIG. 31, a perspective view of a tactic for delivering an inhibiting substance to a target within a building is shown. As with the tactic above, an initial one or more kinetic capsules are used to break glass or other glass-like, i.e. frangible, material of the building, such as, for example, acrylic, plexi-glass or the like. These "glass-breaker" capsules are followed by impairing capsules that deliver the inhibiting substance to the target. Again, as with the tactic described with respect to FIG. 30, frangible capsules in accordance herewith, containing breaker balls may be employed as the first round of projectile systems in order to break the glass-like barrier behind which the target is located.

Advantageously, the impairing capsules need not actually impact the target to be effective. Specifically, so long as the capsules impact sufficiently near the target that the cloud is inhaled by the target, or otherwise affects the target's respiration or other mucus membranes, such capsules will be effective at achieving their intended purpose, i.e., inhibiting or impairing the target. Thus, for example, where an animal, such as a dog or large cat, e.g. mountain lion, is being targeted, the capsules, in accordance herewith, may be impacted on the ground near the animal's face or on another object near the animal's head or may be targeted directly to the animal's head or body. In this case, (except, perhaps where the animal's head is targeted) the present invention provides a non-lethal means for subduing an animal that may pose a danger to humans or that may be in need of assistance itself.

Thus, in accordance with the present aspect, and quite advantageously, the projectile systems, because their dispersal mechanism is so optimized, may be used to inhibit a target when the target cannot actually be targeted. By way of further example, an individual hiding within a bathroom stall cannot be seen and thus for law enforcement personnel to attempt to confront the individual could place the law enforcement personnel in great danger. However, with the projectile systems of the present system, the officer need simply fire the projectiles at the wall above the stall within which the target is hiding or at a solid object near the target individual. The capsules of the system will rupture and the contents thereof will waft down into the stall, where they will be inhaled by the target and/or contact the target's mucous membranes, thereby incapacitating him/her. In fact, the inventors have tested this scenario using the projectiles of the present invention and have found the results to be quite impressive. The individual could not escape the effects of the inhibiting substance and was well incapacitated thereby.

A further advantage of embodiments described herein lies in the discovery that common, household hair spray performs well as a sealer to maintain a powdered inhibiting substance, such as powdered oleoresin capsicum, against a surface. Thus, for example, a target that has been hit with one or more projectiles, as well as a surrounding area, can be sprayed with hair spray prior to being handled by law enforcement or military personnel in order to prevent said personnel from having to cope with powdered inhibiting substance residues that may be on a target or in an area around a target following use of embodiments described herein. As with many other aspects of the present embodiments, the use of hair spray to seal a powdered inhibiting substance to a surface following use of such embodiments, provides a low cost, practical, commercially viable, approach to a problem that, to the inventors' knowledge is unaddressed in the prior art. It is expected that various other spray adhesives, will similarly perform this sealing function, and thus, should be understood to be contemplated herein, by the inventors.

In any case, absent a solution to the problem of residual inhibiting substance or irritant, it is highly questionable whether any law enforcement or military agency (particularly law enforcement agency) would adopt a powder-filled projectile as a non-lethal or less-than-lethal solution. Presently, all commercially viable non-lethal or less-than-lethal approach used by law enforcement and the military, at least to the best of the inventors' knowledge, either do not employ a chemical irritant, or employ a gas, which is diluted and carried away by ambient air currents. In the case of tear gas, however, for example, residual tear gas is a significant problem for personnel operating in an area after tear gas has been deployed. For example, if medical personnel are needed in an area, they are required to wear a breaching apparatus following the use a tear gas, at least until an area can be vented. With the present approach, however, an area can be sealed with hair spray or another spray adhesive following use of a powdered irritant projectile, after which personnel, such as medical personnel, can operate in the area almost immediately without the need for cumbersome and awkward breathing apparatuses with which such personnel may not have any training. Further, if, for example, mouth-to-mouth resuscitation needs to be performed, the present technology allows medical or law enforcement personnel to perform this type of resuscitation without first moving a victim out of an area contaminated by an inhibiting substance. Thus, the ability to seal both a target and an area around a target following use of the projectiles described herein provides a significant, and heretofore unaddressed, solution to a very real problem with heretofore available non-lethal or less-than-lethal projectiles that employ a chemical inhibiting substance or irritant.

Turning now to FIGS. 32 through 40, various alternative designs for projectiles, in accordance with the present invention, are shown. Each of these embodiments, with the exception of the embodiments of FIGS. 36 through 40, employ some variation of the spherical projectile described above, and offer alternative designs suitable for some applications. The inventors, however, are presently of the opnion that the spherical projectile embodiments of FIGS. 1–6, 8–22 are preferred, from the standpoint of effectivity, simplicity and cost.

Referring then to FIG. 32, a cross-sectional view is shown of a projectile system 50 for delivering an inhibiting substance to a living target in accordance with alternative embodiment of the present invention, wherein the projectile system 10 of the embodiment of FIG. 1 is employed to carry the inhibiting substance, and a stabilizer body 52 is employed to increase range.

The projectile system 50 of FIG. 32 employs an inhibiting substance encapsulated within the shell 12, such as described previously above. Alternatively, the shell 12 may have a non-spherical shape, such as a bullet shape, e.g., elliptical, parabolical, prolate spheroidal, two-sheet hyperboloidal, or the like. The shell 12 is mounted to the stabilizer body 52, which has a stabilizer section 54, a puncture tube 56, and an atomization matrix 56. The shell 12 is mounted to the stabilizer body 52 on a forward edge 58 of the atomization matrix 56, and rests on a tip 60 of the puncture tube 56. Wax or adhesive may be used to hold the shell 12 in place.

Upon impact with the target, the shell 12 is forced backwards (relative to the direction of flight of the projectile) into the tip 60 of the puncture tube 56, which punctures the shell 12. This releases the inhibiting substance contained within the shell 12 into an interior region 62 of the atomization matrix 56. From the interior region 62 of the atomization matrix 56, the inhibiting substance is released through a plurality of exit orifices 64 passing through the periphery of the atomization matrix. There are preferably from between 2 and 20, e.g., 10 exit orifices 64 in the atomization matrix 56. Each exit orifice 64 preferably has a circular shape and a diameter of from between about 0.5 mm and 4 mm, e.g., 1 mm.

The stabilizer body 52 is preferably circular in cross-section (taken normal to its direction of flight), having an outer diameter equal to the outer diameter of the shell 12, i.e., from between about 1.0 cm and 5.0 cm, e.g., 1.8 cm. The length of the stabilizer body 52 is from between about 1.5 cm and 5 cm, e.g., 3 cm, and the overall length of the projectile system 50 (i.e., the stabilizer body and the shell) is from between about 2.5 cm and 10 cm, e.g., 5 cm. The stabilizer body 52 is preferably made from plastic or acrylonitrile butadiene styrene resin (ABS), and the stabilizer section 54 has a hollow rear section 66 that has a hollow interior with an inner diameter of from between 1.0 cm and 5 cm, e.g., 1.8 cm, and a depth of from between about 1 cm and 5 cm, e.g., 2 cm. The hollow rear section 66 serves to decrease the mass of the stabilizer body 52 without significant detrimental effect on the aerodynamics of the projectile system 50. The stabilizer body 52 can be made using known plastics molding techniques, such as injection molding.

Referring next to FIG. 33, a cross-sectional view is shown of a projectile system 70 made in accordance with one variation of the projectile 50 of FIG. 32, wherein a plunger 72, or impact piston, is employed to explode the shell 12 containing the inhibiting substance.

The projectile system 70 has a stabilizer body 74, similar in function, dimensions and manufacture, to the stabilizer body 52 described above, and the impact piston 72 is slidable within a piston cylinder 76. The piston cylinder 76 is formed at a forward portion of an atomization matrix 78, similar to the atomization matrix 56 described above. The stabilizer body 74 also employs a stabilizer section 80, similar to the stabilizer section described above. The shell 12 is located between a pair of puncture tubes 82, 84, one of which forms a rearward portion of the impact piston 72, and one of which forms a forward portion of the stabilizer section 80. The shell 12 is located within the atomization matrix 78.

Upon impact with the target, the impact piston 72 is forced rearward by its impact against the target, squeezing the shell 12 between the puncture tubes 82, 84, ultimately causing the shell 12 to rupture. This releases the inhibiting substance within the shell 12 into an interior region 86 of the atomization matrix, from which the inhibiting substance escapes via exit orifices 88 similar to the exit orifices 64, described above.

Referring next to FIG. 34, a cross-sectional view is shown of a projectile system 90 made in accordance with another variation of the projectile system 50 of FIG. 32, wherein an impact piston 92 is employed to explode a shell 12 containing the inhibiting substance.

The projectile system 90 of FIG. 34 is similar in structure and operation to the projectile system 50 of FIG. 32 except as noted below. The projectile system 90 of FIG. 34 employs the impact piston 92 having a bullet-shaped, e.g., elliptic paraboloid, prolate spheroid, two-sheet hyperboloid, or the like, forward end 94. Advantageously, this bullet-shaped forward end 94 provides improved aerodynamics for the projectile system 90, thus facilitating firing over longer distances and/or facilitating use of a lower-powered weapon than is needed to fire the projectiles of FIGS. 32 or 33.

FIG. 35 is a cross-sectional view of a further variation of a projectile system 100, wherein a variation of the impact piston 110 is employed to explode the capsule 12 containing the inhibiting substance, and wherein the atomization matrix 104 is located at a rearward end of the projectile system 100.

Shown are the shell 12 mounted to a stabilizer body 106, which has a puncture tube 108. An impact piston 110 is slidable within a piston cylinder 111 formed at a forward portion of the atomization matrix 104. The shell 12 is located between the impact piston 110 and the puncture tube 108. Advantageously, the atomization matrix 104 is located at a rearward section of the projectile system and exit orifices 114 that make up the atomization matrix 104 are angled forward so as to direct inhibiting substance escaping therethrough toward the front of the projectile, i.e., toward the target. The impact piston 110 of the present embodiment preferably includes a rubber tip 116 aimed at minimizing damage to the target.

Upon impact with the target, the impact piston 110 is forced rearward by impact against the target, squeezing the shell 12 between the impact piston 110 and the puncture tube 108, ultimately causing the shell 12 to rupture. Such rupturing of the shell 12 releases the inhibiting substance within the shell 12 into an interior region 118 of the atomization matrix 104, from which the inhibiting substance escapes via the exit orifices 114 which orifices direct the escaping substance toward the target.

FIG. 36 is a cross-sectional view of a projectile system 200 made in accordance with a variation of the projectile system of FIG. 35, wherein the impact piston 110 is employed to puncture a membrane 202 behind which is contained the inhibiting substance. The membrane may be made from, for example, wax, plastic, acrylic or polyvinylchloride. In all other respects, the projectile system 200 is substantially identical to the projectile system 100 of FIG. 35, and therefore further explanation of its structure and functionality is not made herein.

Referring next to FIG. 37, a cross-sectional view is shown of a projectile system 109 for delivering an inhibiting substance to a living target in accordance with a further embodiment of the present invention, wherein a pressurized canister 112 is employed to carry the inhibiting substance, and a stabilizer section 114 is employed to increase range.

Shown are a plurality of radially oriented exit orifices 116 emanating from a central release chamber 118 into which a valve 120 expels inhibiting substance upon being rearwardly displaced. Also shown are the stabilizer body 80 and a piston 92. The piston 92 is bullet-shaped, similar to the piston 92 shown in FIG. 33 above, with a puncture tube 82 located on a rearward portion thereof. The piston 92 is housed in a cylinder 122 that forms a forward portion of the stabilizer body 114. Alternatively, the pressurized canister 112 may be long enough to itself act also as the target piston 92, thus eliminating the need for a separate piston such as the illustrated piston 92. The stabilizer body 114 also includes a stabilizer section 80 similar to the stabilizer sections 80 described above.

Upon impact, the piston 92 is displaced rearwardly within the cylinder 122, which forces the puncture tube 82 into the valve 120. In response to a force applied by the puncture tube 82, the valve 120 is rearwardly displaced. In response to such rearward displacement, the valve 120 releases the inhibiting substance into the central release chamber 118, from which the inhibiting substance escapes through the exit orifices 116, thereby dispersing the inhibiting substance proximate to the target. Preferably the exit orifices 116 are angled forward so as to better direct the inhibiting substance to the target.

The inhibiting substance is contained within the canister 112 which is formed in, or inserted into a portion 124 of the stabilizer body 114 in front of the stabilizer section. Within the canister 112, the inhibiting substance is pressurized so that it is readily expelled when the valve 120 is opened. The inhibiting substance may be pressurized using, e.g., compressed air techniques or aerosol techniques, such as are known in the art.

FIG. 38 is a cross-sectional view of the projectile system 250 for delivering an inhibiting substance to a living target, wherein a pressurized canister 112 is employed to carry the inhibiting substance, and a stabilizer section 114 is employed to increase range, and wherein the projectile system 250 employs an adhesive material 252 and a mechanical attachment system 254 to attach the projectile to the target during delivery of the inhibiting substance to the target.

Shown are a plurality of radially oriented exit orifices 116 emanating from a central release chamber 118 into which a valve 120 expels the inhibiting substance upon being rearwardly displaced. Also shown are the stabilizer body 80 and a piston 92. The piston 92 is bullet-shaped, similar to the piston shown in FIG. 37 above. The piston 92 is housed in a cylinder 122 that forms a forward portion of the stabilizer body 114. The stabilizer body 114 also includes a stabilizer section 80, which is similar to the stabilizer section 80 described above.

Upon impact the piston 92 is displaced rearwardly within the cylinder 122, which forces the pressurized canister 112 into the valve 120. In response to the force on the valve 120, the valve 120 is rearwardly displaced causing it to open and release the inhibiting substance into the central release chamber 118, from which the inhibiting substance escapes through the exit orifices 116, thereby dispersing the inhibiting substance proximate to the target.

Concomitantly with the rearward displacement of the piston 92, piston locks 256 lock the piston in its displaced position, which in turn locks the pressurized canister 112 in its displaced position, holding the valve 120 in an open state. The piston locks 256 may, for example, operate in a ratchet fashion.

The adhesive material 252 and mechanical attachment system 254, which may comprise a plurality of barbed tips 254, assure that once the projectile system 250 impacts the target it will attach to the target during release of the inhibiting substance, so as to increase the effectivity of the inhibiting substance against the target. The adhesive material is preferably centrally located on a forward end of the piston 92, whereas the barbed tips 254 preferably are located peripherically around the forward end of the piston 92. (Note that in variations of the present embodiment either the adhesive material 252 or the mechanical attachment 254 may be used alone, instead of in combination with each other.)

FIGS. 39A and 39B are side cross-sectional views of alternative projectile systems 300 for delivering an inhibiting substance to a living target in accordance with additional embodiments of the present invention, wherein a twelve-gauge shotgun shell 302 is packed with a rosin bag 304 FIG. 39A that contains an inhibiting substance, such as oleoresin capsicum, or, alternatively and preferably, is packed with one or more capsules containing an inhibiting substance 303 FIG. 39B, such as, for example, is shown in the various embodiments described herein. Advantageously, the modified shotgun shells in accordance with the embodiments illustrated in FIGS. 39A and 39B may be used with standard, commercially available shotguns.

Shown in FIG. 39A are the twelve-gauge shotgun shell 302, the rosin bag 304, an airtight seal 306, wadding 308, and black powder or gun powder 310. Shown in FIG. 39B are the twelve-gauge shotgun shell 302, three spherical capsules 303, protective diaphragms 305 between the capsules, an airtight seal 306, wadding 308, and black powder or gun powder 310. It will be appreciated by those of skill in the art that the diaphragms 305 may be formed of various materials such as, for example, sponge foam, cotton, plastic or other polymer, paper, wadding or similar cushioning material.

Upon firing of the twelve-gauge shotgun shell 302, the black powder 310 is ignited, which causes the expansion of gases forcing the wadding 308 and the rosin bag 304 or capsules 303 and diaphragms 305 out of the twelve-gauge shotgun shell 302. Such forcing out of the wadding 308 and the rosin bag 304 or capsules 303 and diaphragms 305 breaks the airtight seal 306. With respect to rosin bag 304 of FIG. 39A, it contains oleorosin capsicum in powder form, as mentioned above, which, upon impact with the target, causes the target to be inhibited. (The rosin bag 304 is, as is known in the art, porous, so as to allow release of the powdered inhibiting substance upon impact of the rosin bag 304 with the target.) With respect to the capsules 303 and diaphragms 305 of FIG. 39B, the capsules 303 rupture upon impact with the target, as previously described, thereby dispersing the oleoresin capsicum and inhibiting the target. The diaphragms 305 may impact the target or may fall short of the target. The primary purpose of the diaphragms, which are optionally included in this embodiment, is to prevent premature rupture of the capsules during shipment, carrying and/or loading of the shotgun shell 302.

Referring next to FIG. 40, an end cross-sectional view is shown of the projectile system 300. Shown are the twelve-gauge shotgun shell 302 and the rosin bag 304. As can be seen, the rosin bag 304 is folded within the twelve-gauge shotgun shell 302 so as to fit tightly within the twelve-gauge shotgun shell 302. Upon firing of the twelve-gauge shotgun shell 302, the rosin bag 304 expands and unfolds prior to impact with the target so as to maximize exposure of the target to the rosin bag 304, thus maximizing its inhibiting effect.

Referring to FIGS. 41 through 45, several exemplary embodiments of delivery devices suitable for projecting the projectiles described above at a target are shown. While various devices are shown, the inventors have presently focused most of their research activity on perfecting the projectiles described above. It is contemplated, however, that subsequent improvements to the delivery devices (or launchers) will be forthcoming in the not-to-distant future. At the same time, it is to be appreciated that the projectiles described above with reference to FIGS. 1–6 and 8–22 can be satisfactorily launched using commercially available paint ball equipment, such as, for example, compressed gas paintball launchers, which are of course readily available in the commercial market, and very inexpensive compared to heretofore available equipment for launching or firing non-lethal or less-than-lethal projectiles.

Referring first to FIG. 41 a cross-sectional view is shown of a custom launch device 400 useable in combination with projectiles described herein for delivering an inhibiting substance to a living target. Advantageously, the launch device depicted is in the form of a PR24 police baton, such as those commonly used by law enforcement officers. Shown are a plurality of projectile systems 402 loaded within a chamber 404 of the launch device. The chamber 404 also houses a spring 406, which is used to push the projectile systems 402 into position for firing. A flapper valve 408 retains the projectile systems 402, allowing only a single projectile system 418 to move into the barrel 410 for firing. The chamber 404 and the barrel 410 together form the baton portion of the PR24 police baton.

Within a handle portion of such baton, a valve switch 412 and a propellent cylinder 414 are housed. A removable cap 416 on an end of the handle portion can be used to load the propellant cylinder 414 into the device 400. When launch of a projectile is desired, the valve 412 is opened by operation of a button or trigger (not shown) which releases a measured amount of propellent from the propellent cylinder 414 into the barrel 410 behind the single projectile system 418. This propellent is preferably $CO_2$ or compressed air and propels the single projectile 418 down the barrel and out the end of the launch device toward a target. When reloading of the device is desired, another removable cap 420 is removed, along with the spring 406, and a plurality of projectiles are loaded into the chamber 402 behind the flapper valve 408.

Referring next to FIG. 42, a cross-sectional view is shown of another custom launch device 450 useable with projectiles described above for delivering an inhibiting substance in accordance with another embodiment of the present invention. Advantageously the launch device 450 assumes the form of a flashlight, including batteries 452, an on/off switch 454 and a reflector housing 456 of conventional design. Also shown are a propellent cylinder 458, a valve switch 460, a projectile system 462, a barrel 464 and a removable cap 466.

When firing of the projectile system 462 is desired, the removal cap 466, which may be attached on one side, such as by a hinge, is opened, the device 450 is aimed at the target and the valve switch 460 is opened by the depression of a button or trigger (not shown). The opening of the valve switch 460 releases propellent gas from the propellent cylinder 458 into the barrel 464 behind the projectile system 462, thus propelling the projectile system 462 down the barrel 464 toward the target whereat it delivers the inhibiting substance to the target.

In FIG. 43, a cross-sectional view of an adaptation of the custom launch device 500 of FIG. 41, for delivering ball-type projectile systems in rapid successive firings, is shown. The spring 502, the projectile chamber 504, the valve 506, the propellent cylinder 508, the barrel 510, the flapper valve 512, the projectile system in position for launch 514, the removable cap 516 and the other removable cap 518 can be seen. Operation of the launch device 500 depicted in FIG. 43 is substantially identical to operation of the launch device 400 depicted in FIG. 41 and therefore further explanation of the functionality and structure depicted is not made herein.

Referring next to FIG. 44, a cross-sectional view is shown of an adaptation of a custom launch device 550 for delivering ball-type projectile systems, wherein a plurality of barrels 566, 568 are employed to allow the simultaneous or rapid successive firing of projectile systems 562, 565 without reloading. Shown are the batteries 552, the on/off switch 554, the reflector housing 556, the propellent cylinder 558, the valve switch 560 and the removable cover 570. The propellant cartridge 558, the valve switch 560, the removable cover 570, the projectile systems 562, 565 and the barrels 566, 568 are housed within an enlarged portion 570 of the launch device 550 so as to accommodate the two barrels 566, 568 within the circumference of the launch device 550.

Except as noted hereinabove, the structure and operation of the launch device depicted in FIG. 44 is substantially identical to the structure and function of the launch device depicted in FIG. 42, and therefore further explanation of the launch device of FIG. 44 is not made herein except to note that the valve switch 560 is preferably selective, such that the firing of a projectile from only one of the barrels 566, 568 at a time occurs. For example, a first depression of a button, may cause the valve switch 560 to direct a measured amount of propellant gas into one of the barrels 566, and a second depression of the button may cause the valve switch 560 to direct the measured amount of propellant gas into the other of the barrels 568. Other embodiments may allow simultaneous firing of projectiles from both barrels 566, 568 or manual selection of from which barrel 566, 568 to fire, and therefore selection of which projectile to fire. This latter embodiment may be useful for example when two different projectiles, carrying two different substances, for example, an inhibiting substance and marking substance are utilized.

Referring finally to FIG. 45, an end view is shown of the launch device 550 described in FIG. 44, wherein two or more barrels 566, 568 allow multiple, simultaneous or rapid successive projectile launches.

While the invention herein disclosed has been described by means of specific embodiments and applications thereof, numerous modifications and variations could be made thereto by those skilled in the art without departing from the scope of the invention as set forth in the claims.

What is claimed is:

1. A system comprising:

a frangible projectile to be impacted with a target;

the frangible projectile comprising a rigid frangible shell having a thickness and a volume formed within, wherein the rigid frangible shell ruptures upon impact with the target; and an inhibiting substance contained within the volume and occupying at least about 50% of the volume;

wherein the inhibiting substance comprising a powdered inhibiting substance, wherein upon impact with the target the rigid frangible shell ruptures radially dispersing the powdered inhibiting substance proximate to the target into a cloud; and wherein the inhibiting substance comprises powdered oleoresin capsicum.

2. The system of claim 1 wherein the frangible projectile is without a cartridge containing an ignitable powder for launching the frangible projectile.

3. The system of claim 11 further comprising a compressed gas launcher for launching the frangible projectile.

4. The system of claim 1 wherein the rigid frangible shell includes a material selected from the group consisting of polymers and plastics.

5. The system of claim 1 wherein the rigid frangible shell further comprises at least one structurally weakening feature.

6. The system of claim 1 wherein the rigid frangible shell comprises at least two parts.

7. The system of claim 1 wherein the inhibiting substance further comprises a solid substance contained within the volume.

8. The system of claim 1 further comprises a marking substance contained within the volume.

9. The system of claim 1 wherein the inhibiting substance further comprises a weighting substance contained with the volume.

10. A system comprising:

a frangible projectile without a cartridge containing an ignitable powder for launching the projectile, the frangible projectile to be impacted with a target;

wherein the frangible projectile comprises a frangible shell having a thickness and a volume within, the frangible shell comprising a rigid plastic materal that ruptures upon impact with thetarget; and an inhibiting substance within the volume and occupying at least about 50% of the volume within the frangible shell;

wherein the inhibiting substance comprises a powdered inhibiting substance, wherein upon impact with the target, the frangible shell ruptures radially dispersing the powdered inhibiting substance proximate to the target into a cloud; and wherein the powdered inhibiting substance comprises a powdered oleoresin capsicum.

11. The system of claim 10 further comprising a compressed gas launcher for launching the frangible projectile.

12. The system of claim 10 wherein the shell further comprises at least one structurally weakening feature.

13. The system of claim 10 wherein the sealed frangible shell comprises at least two parts.

14. The system of claim 10 wherein the inhibiting substance further comprises a solid substance contained within the volume.

15. The system of claim 10 wherein the inhibiting substance further comprises a marking substance contained within the volume.

16. The system of claim 10 wherein the inhibiting substance further comprises a weighting substance contained within the volume.

17. The system of claim 10 wherein the frangible projectile comprises a compressed gas launchable frangible projectile.

* * * * *

UNITED STATES PATENT AND TRADEMARK OFFICE
CERTIFICATE OF CORRECTION

PATENT NO.    : 6,393,992 B1
DATED         : May 28, 2002
INVENTOR(S)   : Vasel

It is certified that error appears in the above-identified patent and that said Letters Patent is hereby corrected as shown below:

<u>Column 35,</u>
Line 26, change "11" to -- 1 --

<u>Column 36,</u>
Line 11, change "thetarget" to -- the target -- (insert space)

Signed and Sealed this

Eleventh Day of November, 2003

JAMES E. ROGAN
*Director of the United States Patent and Trademark Office*

(12) EX PARTE REEXAMINATION CERTIFICATE (9240th)
United States Patent
Vasel et al.

(10) Number: US 6,393,992 C1
(45) Certificate Issued: *Aug. 28, 2012

(54) NON-LETHAL PROJECTILE FOR DELIVERING AN INHIBITING SUBSTANCE TO A LIVING TARGET

(75) Inventors: Edward J. Vasel, San Diego, CA (US); Scott C. Nunan, San Diego, CA (US); Gregory A. Niederhaus, San Diego, CA (US); Peter G. Coakley, Cardiff, CA (US)

(73) Assignee: Agility Capital, LLC, Santa Barbara, CA (US)

Reexamination Request:
No. 90/008,728, Aug. 13, 2007

Reexamination Certificate for:
Patent No.: 6,393,992
Issued: May 28, 2002
Appl. No.: 09/289,258
Filed: Apr. 9, 1999

(*) Notice: This patent is subject to a terminal disclaimer.

Certificate of Correction issued Nov. 11, 2003.

Related U.S. Application Data

(63) Continuation-in-part of application No. 08/751,709, filed on Nov. 18, 1996, now Pat. No. 5,965,839.

(51) Int. Cl.
*F42B 12/46* (2006.01)

(52) U.S. Cl. ........................ 102/502; 102/367; 102/444; 102/517; 102/529; 102/370; 473/577

(58) Field of Classification Search ........................ None
See application file for complete search history.

(56) References Cited

To view the complete listing of prior art documents cited during the proceeding for Reexamination Control Number 90/008,728, please refer to the USPTO's public Patent Application Information Retrieval (PAIR) system under the Display References tab.

*Primary Examiner* — Jeffrey R. Jastrzab

(57) ABSTRACT

Projectile systems are provided herein employing an inhibiting and/or marking substance for impairing/marking a living target, such as a human or animal target, which projectile systems are optimized to provide maximum effectiveness by impacting the target with sufficient force to cause the target to move into a simultaneously radially dispersing inhibiting/marking substance contained within a capsule of the projectile system. In preferred embodiments, the projectile system includes a generally spherical capsule that is optimally filled to greater than about 50%, more preferably about 75% to 99% of its total volume, most preferably to about 90% of capacity, with the substance to be delivered to the target. The capsule is preferably formed as two about equal halves. Each half is then filled to about 90% of its capacity with the substance, which is compressed mechanically or a thin membrane, preferably a paper foil, is placed over the substance or the substance is mechanically compressed within each half to retain the same within the half capsule. The two half capsules are then brought together, for example, by snapping them together, and are then sealed to one another. In an alternative embodiment, the sealed capsule employs a plurality of dimples or a matrix of global scoring in an exterior or interior surface of the capsule of the projectile system to facilitate rupture of the capsule upon impact with a living target. The projectile systems described herein are easily and inexpensively manufactured; are readily incorporated into existing armed officer training programs; and are extremely effective at stopping, slowing and/or marking a living target.

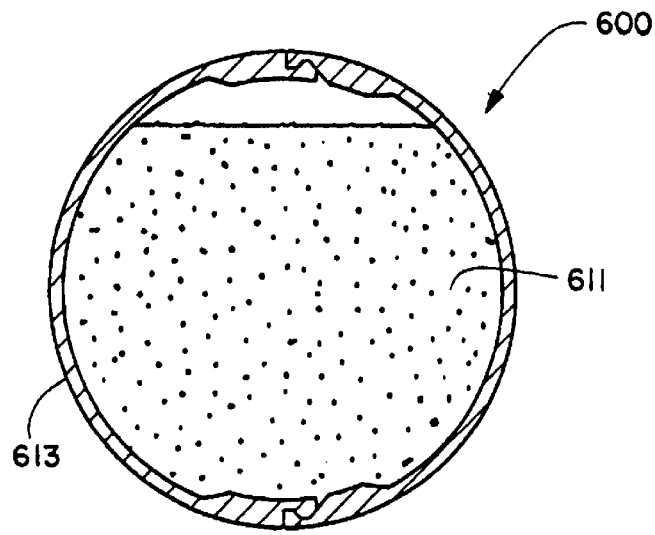

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are cancelled.

* * * * *